US011645809B2

(12) United States Patent
Hosenpud et al.

(10) Patent No.: US 11,645,809 B2
(45) Date of Patent: *May 9, 2023

(54) INTELLIGENT STYLUS BEAM AND ASSISTED PROBABILISTIC INPUT TO ELEMENT MAPPING IN 2D AND 3D GRAPHICAL USER INTERFACES

(71) Applicant: zSpace, Inc., San Jose, CA (US)

(72) Inventors: Jonathan J. Hosenpud, San Francisco, CA (US); Clifford S. Champion, San Jose, CA (US); David A. Chavez, San Jose, CA (US); Kevin S. Yamada, Sunnyvale, CA (US); Alexandre R. Lelievre, Hollywood, CA (US)

(73) Assignee: zSpace, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/190,265

(22) Filed: Mar. 2, 2021

(65) Prior Publication Data

US 2021/0183132 A1 Jun. 17, 2021

Related U.S. Application Data

(63) Continuation of application No. 16/562,944, filed on Sep. 6, 2019, now Pat. No. 10,943,388.

(51) Int. Cl.
*G06T 19/00* (2011.01)
*G06N 20/00* (2019.01)
(Continued)

(52) U.S. Cl.
CPC ........... *G06T 15/06* (2013.01); *G06F 9/3877* (2013.01); *G06N 7/01* (2023.01); *G06T 15/005* (2013.01); *G06T 15/10* (2013.01); *G06T 19/006* (2013.01)

(58) Field of Classification Search
CPC .................................................. G06F 3/04842
See application file for complete search history.

(56) References Cited

U.S. PATENT DOCUMENTS 7,528,823 B2  5/2009  Balakrishnan et al.
8,681,178 B1*  3/2014  Tseng .................... G06T 19/006
                                                     345/633
(Continued)

FOREIGN PATENT DOCUMENTS

WO       03083822 A1   10/2003
WO    2016099906 A2    6/2016

OTHER PUBLICATIONS

Gebhardt, Sascha et al., "ViSTA Widgets: a Framework for Designing 3D User Interfaces from Reusable Interaction Building Blocks," Visual Computing Institute, RWTH Aachen University, JARA—High-Performance Computing, ACM, VRST '16, Nov. 2-4, 2016, Garching bei Munchen, Germany, 10 pages.

(Continued)

*Primary Examiner* — Phong X Nguyen
(74) *Attorney, Agent, or Firm* — Kowert, Hood, Munyon, Rankin & Goetzel, P.C.

(57) ABSTRACT

Systems and methods for implementing methods for user selection of a virtual object in a virtual scene. A user input may be received via a user input device. The user input may be an attempt to select a virtual object from a plurality of virtual objects rendered in a virtual scene on a display of a display system. A position and orientation of the user input device may be determined in response to the first user input. A probability the user input may select each virtual object may be calculated via a probability model. Based on the position and orientation of the user input device, a ray-cast procedure and a sphere-cast procedure may be performed to determine the virtual object being selected. The probability of selection may also be considered in determining the (Continued)

US 11,645,809 B2

Page 2 virtual object. A virtual beam may be rendered from the user input device to the virtual object.

20 Claims, 18 Drawing Sheets

(51) Int. Cl.
G06T 15/06 (2011.01)
G06T 15/00 (2011.01)
G06F 9/38 (2018.01)
G06T 15/10 (2011.01)
G06N 7/01 (2023.01)

(56) References Cited

U.S. PATENT DOCUMENTS

| | | | |
|---|---|---|---|
| 9,467,685 B2 | 10/2016 | Chavez et al. | |
| 9,607,428 B2 | 3/2017 | Li | |
| 9,778,814 B2 | 10/2017 | Ambrus et al. | |
| 9,928,648 B2 | 3/2018 | Ambrus et al. | |
| 10,019,849 B2* | 7/2018 | Berman | H04N 13/368 |
| 10,943,388 B1* | 3/2021 | Hosenpud | G06F 3/0386 |
| 11,430,044 B1* | 8/2022 | Maron | G06V 10/751 |
| 2005/0243054 A1* | 11/2005 | Beymer | G06F 3/013 |
| | | | 382/103 |
| 2009/0083669 A1 | 3/2009 | Fitzmaurice et al. | |
| 2014/0267420 A1* | 9/2014 | Schowengerdt | G02B 27/0093 |
| | | | 345/633 |
| 2015/0177861 A1* | 6/2015 | McCaughan | G06F 3/0304 |
| | | | 345/173 |
| 2016/0012631 A1* | 1/2016 | Kim | G06T 19/006 |
| | | | 345/419 |
| 2017/0109936 A1* | 4/2017 | Powderly | G06F 3/0346 |
| 2017/0178012 A1* | 6/2017 | Borza | G06F 12/0862 |
| 2018/0101986 A1 | 4/2018 | Burns et al. | |
| 2018/0158251 A1 | 6/2018 | Pasek | |
| 2018/0181809 A1* | 6/2018 | Ranjan | G06V 10/82 |
| 2018/0307303 A1 | 10/2018 | Powderly et al. | |
| 2019/0018485 A1* | 1/2019 | Aleem | G02B 27/017 |
| 2019/0310756 A1 | 10/2019 | Vathauer et al. | |
| 2019/0333162 A1* | 10/2019 | Wang | G06N 20/20 |
| 2019/0362557 A1* | 11/2019 | Lacey | G06F 3/012 |
| 2020/0054947 A1* | 2/2020 | Wu | A63F 13/537 |
| 2020/0104420 A1* | 4/2020 | Chatterjee | G06F 16/9038 |
| 2021/0042520 A1* | 2/2021 | Molin | G06N 3/084 |
| 2021/0183132 A1* | 6/2021 | Hosenpud | G06T 15/10 |
| 2022/0012002 A1* | 1/2022 | Bar-Zeev | G06V 20/20 |
| 2022/0023760 A1* | 1/2022 | Wan | A63F 13/2145 |

OTHER PUBLICATIONS

International Search Report and Written Opinion of International application No. PCT/US20/48964, dated Jan. 26, 2021, 10 pgs.

* cited by examiner

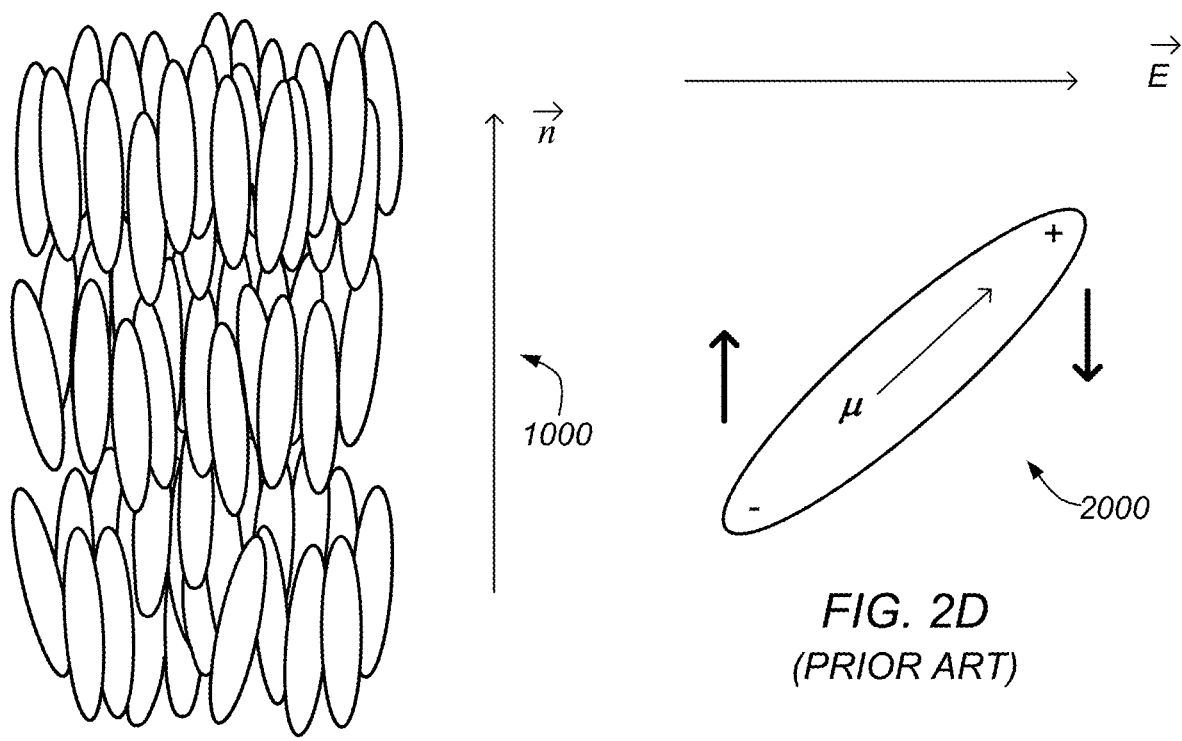
FIG. 2C
(PRIOR ART)
FIG. 2D
(PRIOR ART)
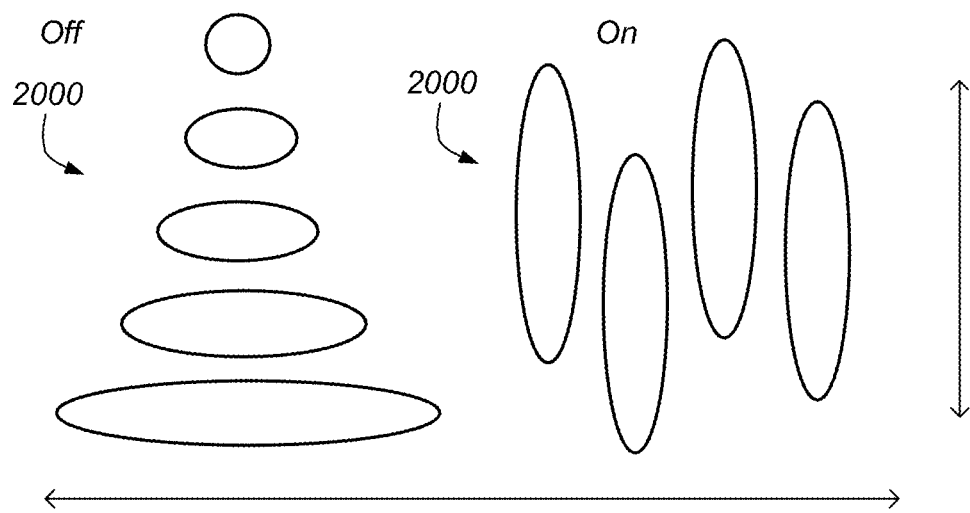
FIG. 2E
(PRIOR ART)

INTELLIGENT STYLUS BEAM AND ASSISTED PROBABILISTIC INPUT TO ELEMENT MAPPING IN 2D AND 3D GRAPHICAL USER INTERFACES

PRIORITY DATA

This application is a continuation of U.S. patent application Ser. No. 16/562,944, titled "Intelligent Stylus Beam and Assisted Probabilistic Input to Element Mapping in 2D and 3D Graphical User Interfaces", filed Sep. 6, 2019, which is hereby incorporated by reference in its entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

This disclosure relates to the field of digital display and more particularly to methods and systems for assisting in the determination of the most likely virtual object that the user intends to select when interacting with a virtual scene.

DESCRIPTION OF THE RELATED ART

Three-dimensional (3D) displays (actually, simulated 3D, e.g., via stereoscopic display (SD) techniques) are increasingly utilized for a variety of applications, including, for example, remote viewing, videoconferencing, video collaboration, and so forth.

FIG. 1 illustrates a modern display chain, according to typical prior art embodiments, which includes the following components:

1. GPU—Graphics Processing Unit. This component resides on a personal computer, workstation, or functional equivalent, and outputs video levels for each color or channel of a supported color model, e.g., for each of three colors, typically Red (R), Green (G), and Blue (B), for each pixel on the display. Each of these numbers is typically an 8-bit number, with a range of 0 to 255, although other ranges are possible.

2. Scaler—This component takes as input the video levels (e.g., for R, G, and B) for each pixel output from the GPU, and processes them in various ways, before outputting (usually) modified video levels for RGB, usually in the same 8-bit range of 0-255. This component may also scale an image from the input resolution to a different, rendered resolution supported by the display.

3. Panel—This component is the display itself, typically a liquid crystal display (LCD), though other displays are possible, and takes as input the video levels (e.g., for R, G and B) output from the scaler for each pixel, and converts the video levels to voltages, which are then delivered to each pixel on the display. The panel itself may modify the video levels before converting them to voltages.

The video chain generally modifies the video levels in two ways, specifically gamma correction and overdrive. Note that the functionality described above is typically implemented in the scaler, but is sometimes implemented at least partially in other devices or elements of the video chain, e.g., in the GPU or display device (panel).

Time Sequential Stereo Displays

Unlike a normal (i.e., monoscopic) display, in a stereo display, there are two images for each video frame: right and left. The right image must be delivered to only an observer's right eye, and the left image must be delivered to only the observer's left eye. In a time sequential stereo display, this separation of right and left images is performed in time, i.e., the left and right images are presented sequentially, and thus, contains some time-dependent element which separates these two images. There are two common architectures for stereo displays.

The first architecture uses a device called a polarization switch (PS), which may be a distinct (i.e., separate) or integrated LC device or other technology switch and which is placed in front of the LCD panel (or any other type of imaging panel, such as an OLED (organic light emitting diode) panel, a plasma display, etc.) or any other pixelated panel display used in a time-sequential stereo imaging system. Specifically, the PS switch may be placed between the display panel and the viewer, as shown in FIG. 2A. The purpose of the PS is to switch the light transmitted from the display panel between two orthogonal polarization states. For example, one of these states may be horizontally linearly polarized light (i.e., the light may be in a horizontal linear polarization state), and the other may be vertically linearly polarized light (i.e., the light may be in a vertical linear polarization state); however, other options are possible (e.g., left and right circular polarization states, etc.). The key feature that allows the PS to deliver the correct image to the correct eye of the viewer (i.e., the left image to the left eye and the right image to the right eye) is that the two polarization states are orthogonal to each other.

This architecture allows achievement of the stereo effect shown in prior art FIG. 2B. As may be seen, the top portion of the figure shows the (display) panel switching between a left image and a right image. Synchronous with the panel switching, the PS is switching the light being transmitted between a left state and a right state, as shown. These two states emit two corresponding orthogonal polarization states, as explained above. As FIG. 2B further shows, the system includes stereoscopic eyewear that is designed such that the left lens will only pass the left state polarization and the right lens will only pass the right state polarization. In this way, separation of the right and left images is achieved.

The second conventional architecture uses stereoscopic shutter glasses, which replace (or integrate the functionality of) the PS and eyewear. In such systems, each eye is covered by an optical shutter, which can be either open or closed. Each of these shutters is cycled between opened and closed synchronously with the display panel in such a way that when the left image is shown on the display, only the left eye shutter is open, and when the right image is shown on the display, only the right eye shutter is open. In this manner, the left and right views are alternatingly presented to the user's left and right eye, respectively. The alternate presentation of left and right views to the user's left and right eyes creates the perception of visual depth. Virtual objects may be displayed in this created 3D space, which exists both above the 3D stereoscopic display panel (i.e., negative space) and below the stereoscopic display panel (i.e., positive space).

Liquid Crystal Displays (LCDs)

Some of the advantages of a liquid crystal display (LCD) include lighter weight, lower power consumption, and less radiation contamination. LCD monitors have been widely applied to various portable information products (e.g., user equipment devices such as laptops, tablets, mobile phones, PDAs, and so forth). Typically, in an LCD monitor, incident light produces different polarization or refraction effects when the alignment of liquid crystal molecules is altered. The liquid crystal molecules affect the transmission of the incident light, and thus a magnitude of the light emitted from the liquid crystal molecules varies. The LCD monitor utilizes the characteristics of the liquid crystal molecules to control the corresponding light transmittance and produces images per different magnitudes of red, blue, and green light.

A schematic image of a nematic liquid crystalline phase 1000 is shown in FIG. 2C. The liquid crystal materials have no positional long-range ordering of their molecules' centers of mass, as in crystals. However, the liquid crystal materials possess long-range orientational ordering of their molecules along a main axis direction (in the simplest case of so-called nematic liquid crystal), effectively allowing the molecules to be aligned along one preferred direction, called the director of the liquid crystal, n (see FIG. 2C).

Liquid crystal molecules either possess a permanent dipole moment, or acquire the induced dipole moment when placed in an electric field. In both cases, in the electric field a liquid crystal molecule 2000 is characterized by some dipole moment, p. This dipole may be aligned along the molecule's symmetry axis (such materials are said to have the positive dielectric anisotropy) or perpendicular to it (the negative dielectric anisotropy). The separation of charge in a molecule leads to its rotation in the electric field until it is aligned parallel or perpendicular to the applied field, depending on a sign of the material's dielectric anisotropy. FIG. 2D depicts such re-orientation of a liquid crystal molecule with the positive dielectric anisotropy.

As all of the molecules in the liquid crystalline phase are subject to the re-orientation under the effect of the electric field at the same time, it is possible to control the symmetry axis of the phase (the director) and usually the optical axis of the liquid crystalline sample.

FIG. 2E illustrates the configuration of liquid crystal molecules within a conventional twisted nematic liquid crystal-based polarization rotator. The nematic liquid crystal is chosen to have a positive dielectric anisotropy. The left-hand side of the figure illustrates the voltage OFF, 90-degree rotation state. The right-hand side of the figure illustrates the voltage ON, 0-degree rotation state.

Depending on the type of the liquid crystal cell and the relative orientations of the liquid crystal cell's optical axis and the polarizers' transmission axis, the polarization rotator can operate in either Normal White (NW) or Normal Black (NB) mode. These modes are governed by the optical transmission in the zero or low-voltage state, i.e. the Normal White mode corresponds to the maximum optical transmission in the zero or low-voltage state, and the minimum transmission in the high-voltage state; it is the opposite for the Normal Black mode.

The twisted nematic polarization rotator usually operates in the Normal White mode. In this case the higher applied voltage improves the contrast ratio of the Normal White mode due to the decrease of the residual retardation of a liquid crystal cell.

Other type of polarization rotators such as electrically controlled birefringence (ECB) mode can operate both in Normal White and Normal Black modes. Using additional optical elements in the 3D system (such as two orthogonal polarizers), the same polarization rotator can operate in both modes alternately in each frame.

SUMMARY

Various embodiments of systems for implementing methods for user selection of a virtual object in a virtual scene are described herein. In some embodiments, a system may include one or more displays and at least one processor coupled to (or in communication with) the one or more displays. In some embodiments, the one or more displays and at least one processor may be comprised in and/or in communication with a head mounted display system. In some embodiments, the system may include a tracking system communicatively coupled to the at least one processor as well as a memory communicatively coupled to the at least one processor. In some embodiments, the tracking system may include one or multiple cameras. The at least one processor may be configured to perform or implement embodiments of the techniques disclosed herein. Additionally, a method implementing embodiments of the techniques disclosed herein may be implemented on a computer system or stored as program instructions on a computer readable memory medium. In some embodiments, the computer system may comprise a mobile device, such as a user equipment device (UE).

In some embodiments, a user input may be received, e.g., via a user input device. The user input may be an attempt to select a virtual object (e.g., a user interface (UI) element) rendered in a virtual scene on a display of a display system. A position and orientation of the user input device may be determined in response to the first user input. Based on the position and orientation of the user input device, a ray-cast procedure and a sphere-cast procedure may be performed to determine the virtual object being selected. Results of the ray-cast procedure and the sphere-cast procedure may be compared. In some embodiments, when the results differ, ray-cast results may be prioritized over sphere-cast results. In some embodiments, when the results do not differ, the sphere-cast results may be prioritized over the ray-cast results. A virtual beam may be rendered from the user input device to the virtual object based on the comparison. In some embodiments, when ray-cast results are used, the virtual beam may be straight and rigid. In some embodiments, when sphere-cast results are used, the virtual beam may be non-rigid and curve to the virtual object.

In some embodiments, one or more virtual objects may be displayed on (e.g., rendered in a virtual scene of a display of) a display system and a plurality of inputs to a probability model may be determined. In some embodiments, the plurality of inputs to the probability model may include any, any combination of, and/or all of a user head state, a user eye state, a stylus state, a previous output of the probability model, a virtual object state, a user attribute, and/or an output from a device. One or more probabilities that may include a probability that a user intends to select each of the one or more virtual objects may be calculated via the probability model. In some embodiments, the plurality of inputs to the probability model may be processed before calculating the one or more probabilities. Then, responsive to receiving user input indicating a selection of the one or more virtual objects, an intended virtual object may be determined using the calculated one or more probabilities. In some embodiments, a selection probability of an element on the display that corresponds to an advertising element may be recorded.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present disclosure can be obtained when the following detailed description of the preferred embodiment is considered in conjunction with the following drawings, in which:

FIG. 2C illustrates an example of a schematic diagram of a nematic liquid crystalline phase, according to implementations.

FIG. 2D illustrates an example of a schematic diagram of a switching of a liquid crystal molecule in an electric field, according to implementations.

FIG. 2E illustrates an example of a schematic diagram of a configuration of liquid crystal molecules within a conventional twisted nematic liquid crystal-based polarization rotator, according to implementations.

Figure 1:
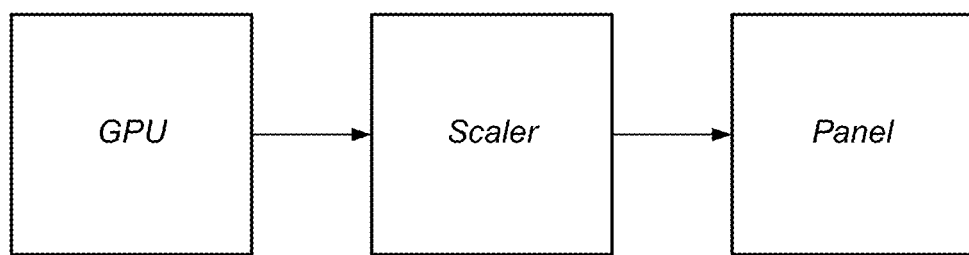
FIG. 1 illustrates a modern display chain, according to implementations.
Figure 2A:
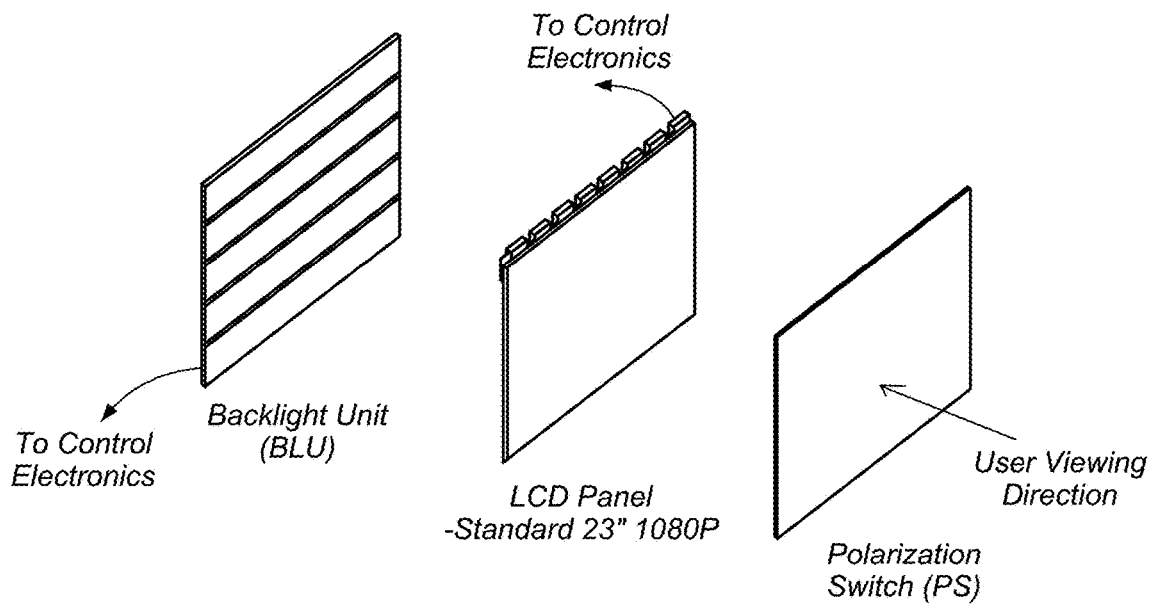
FIG. 2A illustrates an example of an architecture that utilizes a polarization switch, according to implementations.
Figure 2B:
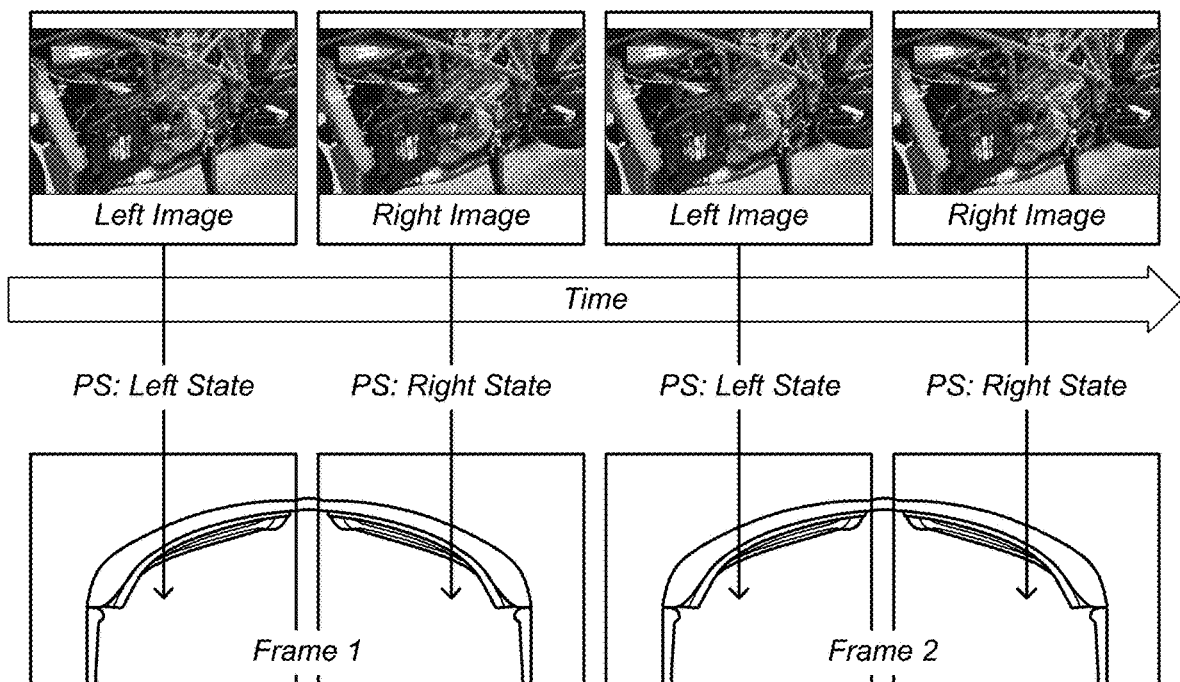
FIG. 2B illustrates an example of a stereo effect (simulated 3D) using polarization switching between left and right views, according to implementations.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Terms

The following is a glossary of terms used in the present application:

Memory Medium—any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, EEPROM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, tablet, or other device or combinations of devices. In general, the term "computer system" can be broadly defined to encompass any device (or combination of devices) having at least one processor that executes instructions from a memory medium.

Graphical Processing Unit—refers to a component that may reside on a personal computer, workstation, server, graphics server, or equivalent, and outputs video levels for each color or channel of a supported color model, e.g., for each of three colors, typically Red (R), Green (G), and Blue (B), for each pixel on the display. Each of these numbers is typically an 8-bit number, with a range of 0 to 255, although other ranges are possible.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element (or Functional Unit)—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Coupled Zone—refers to a physical volume in which the user of a 3D stereoscopic display can view 3D content within the human eye's natural depth of field. For example, when a person sees an object in the physical world, the person's eyes converge on, or look (individually aim) at, the virtual object. Additionally, as the two eyes converge on the virtual object, each eye's lens also focuses, via accommodation, (monoscopically) on the virtual object. In this sense, both eyes focus and converge on the virtual object, thus focus and convergence are "coupled."

Disparity—refers to the difference between the left eye and right eye images of a 3D stereoscopic display. Disparity may be described in at least two ways. First, with respect to the display device, i.e., the 3D stereoscopic display, disparity may be described by the number of pixels of separation between corresponding positions of the image, or content, being displayed, or rendered. In other words, the pixels of separation between the left eye and right eye images, or content. Alternatively, or in addition to, with respect to the point of view of the user, disparity may be described by the degree of angular separation between corresponding positions in the images, or content, being displayed, or rendered, i.e., the angular separation between the left eye and right eye images, or content.

Projection—refers to the display of a 3D object, or content, on a two-dimensional (2D) display. Thus, a projection may be described as the mathematical function applied to objects within a virtual 3D scene to determine the virtual position of the virtual objects within a 3D space that may be defined by the size of the 3D stereoscopic display and the point of view of a user.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene. A viewpoint is synonymous with "point of view" (POV). (See definition of POV below.)

Eyepoint—the physical location (and/or orientation) of a single eye or a pair of eyes. A viewpoint above may correspond to the eyepoint of a person. For example, a person's eyepoint has a corresponding viewpoint.

Point of View (POV)—refers to or specifies a position and orientation. For example, a POV may be a viewpoint or eyepoint, generally of a user, but may also be a viewpoint of an optical device, such as a camera. The POV is generally a means to capture a relationship between two or more 6 degree of freedom objects. In a typical application of the present techniques, a user's pair of eyes or head (view) is positioned in any X, Y, Z position and/or pitch, yaw, roll orientation to a display device, e.g., a monitor screen, which may have its own position in any X, Y, Z position and/or pitch, yaw, roll orientation. In this example, the POV can be defined as the position/orientation of the user's view with respect to the positioning/orientation of the display device. The POV determination may be identified by a capture system. In a typical application of the present techniques, one or more tracking devices are attached to the display device, such that the controller knows what the tracking system tracks in the context of the display device, meaning the tracking system, being attached to the display device, is programmatically aware of the position/orientation of the display device, as well as any potential change to the position/orientation of the display device.

The tracking system (which may identify and track, among other things, the user's view) may identify the position/orientation of the user's view, and this information may then be correlated to the tracking system's identification of the viewing device's position/orientation (again, with respect to the display device).

Vertical Perspective—a perspective effect rendered from a viewpoint which is substantially perpendicular to the display surface. "Substantially perpendicular" refers to 90 degrees or variations thereof, such as 89 or 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective effect rendered from a viewpoint which is not perpendicular to the display surface. More particularly, the term "horizontal perspective" may typically refer to a perspective effect which is rendered using a substantially 45-degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Another conception of the horizontal perspective as commonly used in embodiments of the present techniques relates to the projection of the intended rendered graphics to the viewing device. With the POV determined, a horizontal perspective engine may identify the correct graphics frustum in the 3D space, taking into account the position and orientation of the viewing device as defining the render plane of the frustum and the user's view in position and orientation to define a camera point of the frustum in relation to the render plane. The resultant projection is then rendered onto the viewing device as will be seen by the user.

Position—the location or coordinates of an object (either virtual or real). For example, position may include x, y, and z (i.e., location) coordinates within a defined space. The position may be relative or absolute, as desired. Position may also include yaw, pitch, and roll information, e.g., when defining the orientation of a viewpoint. In other words, position is defined broadly so as to encompass information regarding both location and orientation.

Passive Stylus—a peripheral device or element such as a handheld device, handheld pen device, handheld pointing device, hand, finger, glove, or any object used to directly interact with rendered virtual objects as in a stereo rendered virtual projected objects.

Active Stylus—a peripheral device or element that provides additional capabilities to improve accuracy and precision in the determination of a position of the active stylus. These capabilities may include one or more of accelerometers, magnetometers, gyroscopes, global positioning system, compass, and/or gravity sensor. Examples include a handheld device, handheld pen device, handheld pointing device, and/or any object that includes such capabilities and is used to directly interact with rendered virtual objects as in a stereo rendered virtual projected objects.

Similar—as used herein in reference to geometrical shapes, refers to the geometrical term indicating that objects have the same shape, or that one object has the same shape as the mirror image of the other object. In other words, objects are considered similar if one object may be obtained from the other by uniformly scaling (enlarging or shrinking) the object. Additionally, the term similar, or similar objects, means that either object may be rescaled, repositioned, and reflected, so as to coincide with the other object. Thus, for example, if a first object is geometrically similar to a second object, i.e., has the same shape but possibly a different size, then either object may be uniformly scaled to obtain the geometrical size and shape of the other object. Thus, the first object may be uniformly scaled to obtain the second object or the second object may be uniformly scaled to obtain the first object. Note that this definition of similar only refers to the use of the word in the context of geometrical shapes and retains it ordinary meaning in other contexts (e.g., system A is similar to system B implies that system A resembles system B without being identical to system B).

Approximately—refers to a value that is correct or exact within some specified tolerance. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Proximate—near to; for example, proximate may mean within some specified distance, or within some specified fraction of a distance. Note that the actual threshold for being proximate is generally application dependent. Thus, in various applications, proximate may mean being within 1 mm, 1 inch, 1 foot, 1 meter, 1 mile, etc. of some reference point or object, or may refer to being within 1%, 2%, 5%, 10%, etc., of a reference distance from some reference point or object.

Substantially—refers to a term of approximation. Similar to the term "approximately," substantially is meant to refer to some tolerable range. Thus, if part A is substantially horizontal, then part A may be horizontal (90 degrees from vertical), or may be within some tolerable limit of horizontal. For example, in one application, a range of 89-91 degrees from vertical may be tolerable, whereas, in another application, a range of 85-95 degrees from vertical may be tolerable. Further, it may be that the tolerable limit is one-sided. Thus, using the example of "part A is substantially horizontal," it may be tolerable for Part A to be in a range of 60-90 degrees from vertical, but not greater than 90 degrees from vertical. Alternatively, it may be tolerable for Part A to be in a range of 90-120 degrees from vertical but not less than 90 degrees from vertical. Thus, the tolerable limit, and therefore, the approximation referenced by use of the term substantially may be as desired or as required by the particular application.

Equivalent—refers to an object that is equal to or corresponds with another object in value, measure, function, meaning, effect, significance, appearance, and so forth. For example, a first image may be equivalent to a second image if imagery within the first image corresponds to imagery within the second image. Additionally, a first image may be substantially equivalent to a second image if imagery within the first image at least partially corresponds to imagery with the second image, e.g., within some tolerable range and/or limit.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Comprising—this term is open-ended, and means "including."". As used in the appended claims, this term does not foreclose additional elements, structure, or steps. Consider a claim that recites: "A system comprising a display . . . "; such a claim does not foreclose the system from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

This specification may include references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

FIGS. 3-6 Exemplary Systems

Figure 3A:
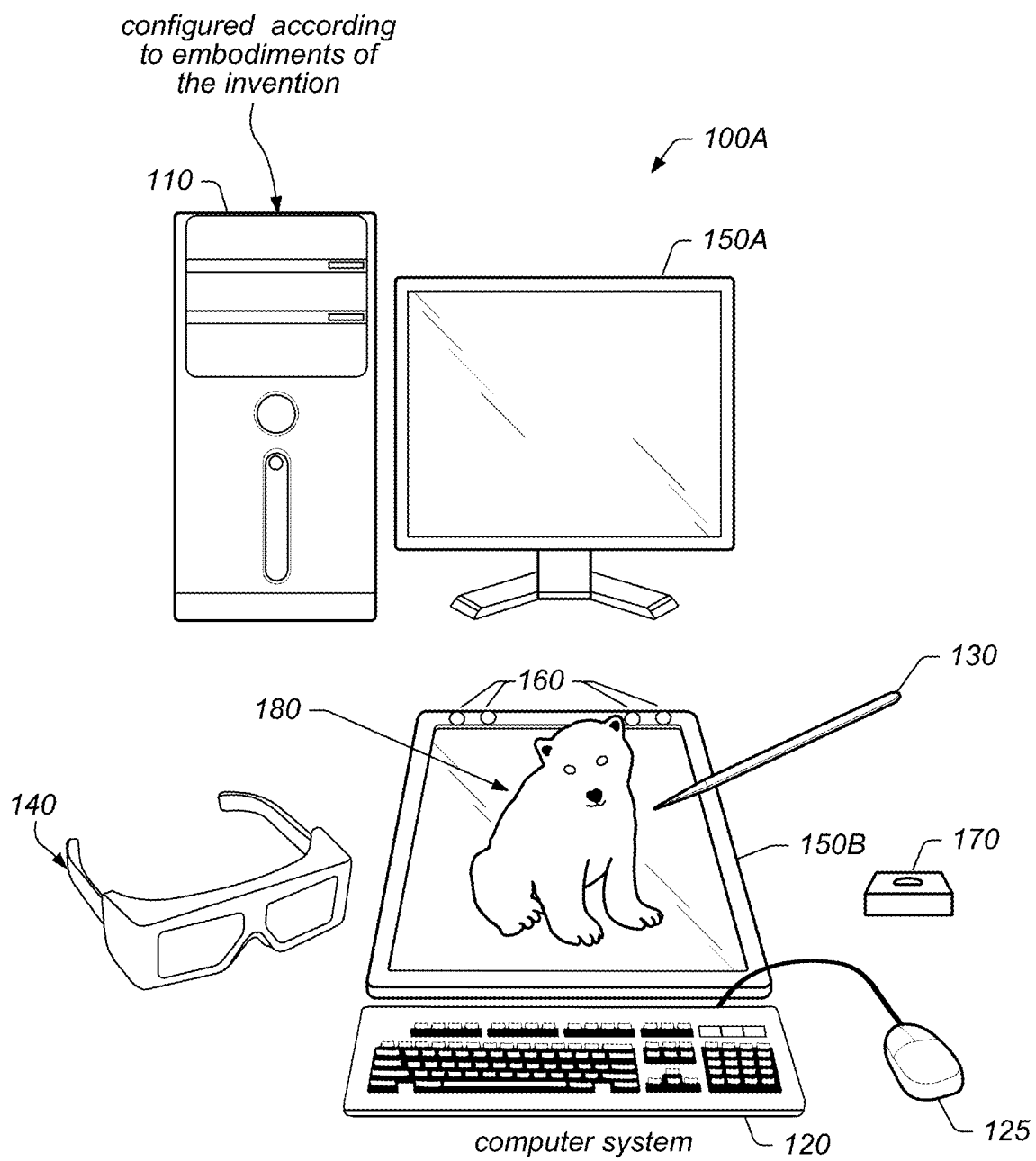
FIGS. 3A and 3B illustrate examples of 3D stereoscopic display systems configured according to some embodiments.
Figure 3B:
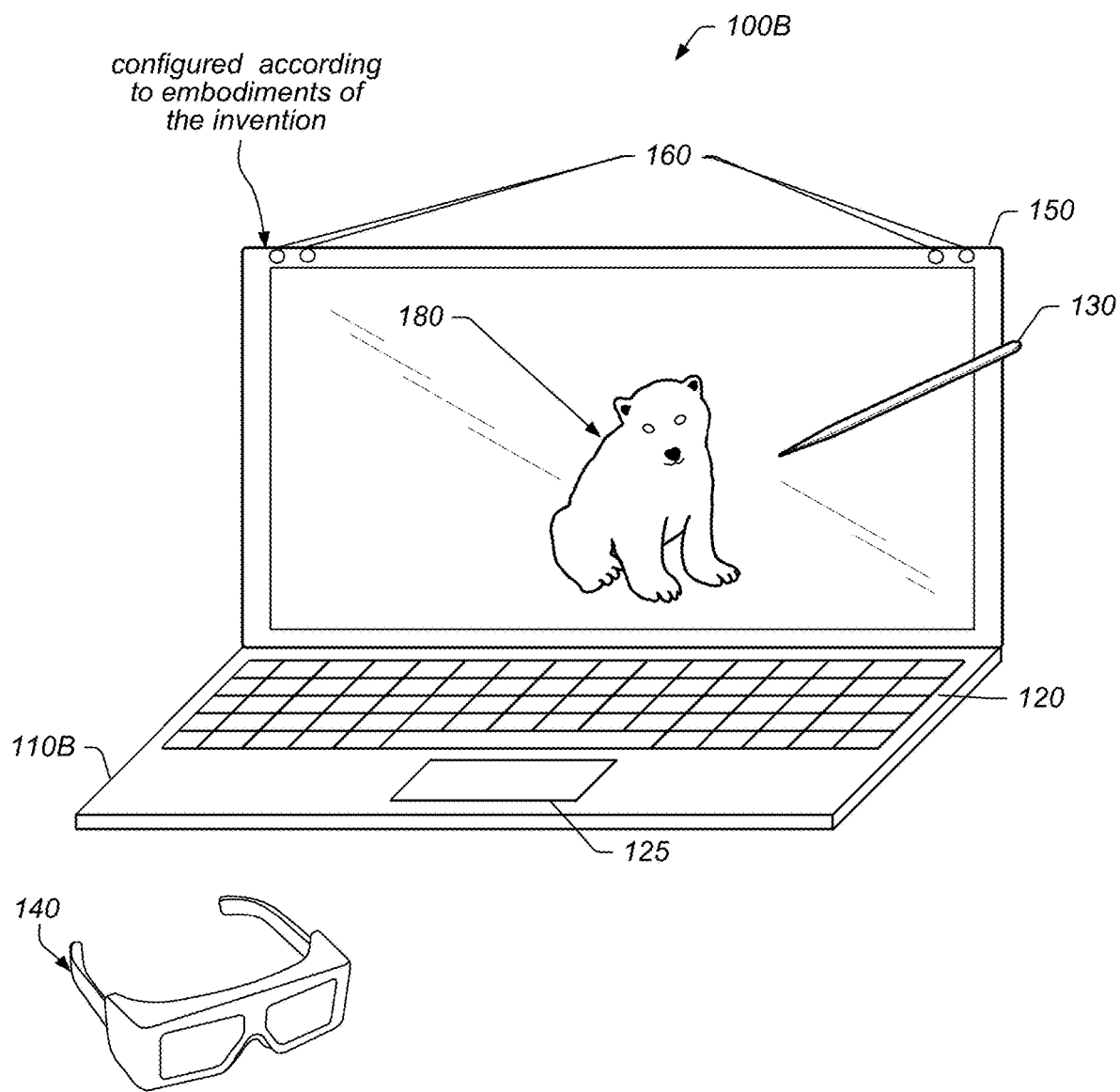

FIGS. 3A and 3B illustrate exemplary systems configured to implement various embodiments of the techniques described below.

In the exemplary embodiment of FIG. 3A, computer system 100A may include chassis 110A, display 150A and display 150B (which may collectively be referred to as display 150 or "one or more displays" 150), keyboard 120, mouse 125, user input device 130, eyewear 140, at least two cameras 160, and caddy 170. Note that in some embodiments, two displays 150A and 150B may not be used; instead, for example, a single display 150 may be used. In various embodiments, at least one of the displays 150A and 150B may be a stereoscopic display. For example, in one embodiment, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110A may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments, the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. For example, the computer system may include a tracking system that may track one or more of a user's head, a user's hand, or the stylus. Additionally, the memory medium may store operating system software, as well as other software for operation of the computer system. Various embodiments further include receiving or storing instructions and/or data implemented in accordance with the foregoing description upon a carrier medium.

As indicated above, the computer system 100A may be configured to display a three-dimensional (3D) scene (e.g., via stereoscopic images), or 3D content, such as scene 180, using the display 150A and/or the display 150B. The computer system 100A may also be configured to display a "view" of the 3D scene using the display 150A, the display 150B, and/or another display, as described in more detail below. The "view" of the 3D scene, or content, may refer to a displayed portion of the 3D scene from a viewpoint within the 3D scene. A viewpoint within the 3D scene may be referred to as a "virtual viewpoint." The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

It should be noted that the embodiment of FIG. 3A is exemplary only, and other numbers of displays are also envisioned. For example, the computer system 100A may include only a single display or more than two displays, or the displays may be arranged in different manners than shown, e.g., as goggles or other wearable eyewear or headgear as further described below in reference to FIG. 5. In this particular embodiment, the display 150A is configured as a vertical display (which may be perpendicular or approximately perpendicular to a user's line of sight) and the display 150B is configured as a horizontal display (which may be parallel (or approximately parallel) or oblique to a user's line of sight). The vertical display 150A may be used (e.g., via instructions sent by a graphics engine executing in the chassis 110A) to provide images which are presented according to a vertical (or central) perspective and the display 150B may be used (e.g., via instructions sent by a graphics engine executing in the chassis 110A) to provide images that are presented according to a horizontal perspective. Descriptions of horizontal and vertical perspectives are provided herein (see, e.g., the above Terms section). Additionally, while the displays 150 are shown as flat panel displays, in other embodiments, they may be any type of device or system which is capable of displaying images, e.g., projection systems. For example, display(s) 150 may be or include a CRT (cathode ray tube) monitor, an LCD (liquid crystal display) monitor, or a front projection or a back-projection screen or surface with a plurality of projectors, among others. Display(s) 150 may include a light emitting diode (LED) backlight or other type of backlight.

Either or both of the displays 150A and 150B may present (display) stereoscopic images for viewing by the user. By presenting stereoscopic images, the display(s) 150 may present a 3D scene for the user. This 3D scene may be considered or referred to as an illusion or simulated 3D because the actual provided images are 2D, but the scene is conveyed in 3D via the user's interpretation of the provided images via stereoscopic effects. In order to properly view the stereoscopic images (one for each eye for each image frame), the user may wear eyewear 140. Eyewear 140 may be any of anaglyph glasses, polarized glasses, shutter glasses, lenticular glasses, etc., among others. In some embodiments, the display(s) 150 may be included (or incorporated) in the eyewear (or other wearable headgear). In embodiments using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens of the eyewear has the corresponding orthogonal polarization for receiving the corresponding image. With shutter glasses, each lens is synchronized with respect to left and right eye images provided by the display(s) 150, e.g., in alternating fashion. The display may provide both polarizations simultaneously or in an alternating manner (e.g., sequentially), as desired.

Thus, the left eye may be allowed to only see left eye images during the left eye image display time and the right eye may be allowed to only see right eye images during the right eye image display time. With lenticular glasses, images form on cylindrical lens elements or a two-dimensional array of lens elements. The stereoscopic image may be provided via optical methods, where left and right eye images are provided only to the corresponding eyes using optical means such as prisms, mirror(s), lens(es), and the like. Large convex or concave lenses can also be used to receive two separately projected images to the user.

In one embodiment, eyewear 140 may be used as a position input device to track the user view (e.g., eyepoint or point of view (POV)) of a user viewing a 3D scene presented by the system 100A. For example, eyewear 140 may provide information (e.g., position information, which includes orientation information, etc.) that is usable to determine the position of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position data suitable for the head tracking. The input device(s), such as a stylus, keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position of the display(s) 150 and the point of view of the user may be used to map a portion of the virtual space to the physical space of the system 100A. In essence, the physical space and components used may be mapped to the virtual model in order to accurately render a 3D scene of the virtual space.

One or more of the user input devices (e.g., the keyboard 120, the mouse 125, the user input device 130, pointing device, user control device, user hand/fingers, etc.) may be used to interact with the presented 3D scene. For example, the user input device 130 (shown as a passive stylus) or simply the user's hands may be used to directly interact with virtual objects of the 3D scene (via the viewed projected objects). Such direct interaction may be possible with negative space portions of the 3D scene. In some embodiments, at least a portion of the 3D scene may be presented in this negative space, which is in front of or otherwise outside of the at least one display, via stereoscopic rendering (of the 3D scene). In some embodiments, at least a portion of the 3D scene may appear as a hologram-like image above the surface of the display 150. For example, when the horizontal display 150B is used, the 3D scene may be seen as hovering above the horizontal display. It should be noted, however, that a portion of the 3D scene may also be presented as appearing behind the display surface, which is in positive space Thus, negative space refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, negative space may be considered to be a "hands-on volume" as opposed to an "inner-volume" (i.e., positive space), which may be under the surface of the display(s), and thus not accessible. Thus, the user may interact with virtual objects in the negative space because they are proximate to the user's own physical space. Said another way, the positive space is located behind (or under) the viewing surface, and so presented objects appear to be located inside (or on the back side of) the physical viewing device. Thus, objects of the 3D scene presented within the positive space do not share the same physical space with the user and the virtual objects therefore cannot be directly and physically manipulated by hands or physically intersected by hand-held tools such as user input device 130. Rather, they may be manipulated indirectly, e.g., via a computer mouse, a joystick, virtual representations of hands, handheld tools, or a stylus, or by projections from the stylus (e.g., a virtual laser or a virtual plane).

In some embodiments, system 100A may include one or more sensors 160. The one or more sensors 160 may be included in a tracking system. FIG. 3 illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Alternatively, fewer than four sensors may be used (e.g., two sensors), wherein each sensor may track both the user (e.g., the user's head and/or the user's point of view) and the user input device. Sensors 160 may be used to image a user of system 100A, track a user's movement, or track a user's head or eyes, among other contemplated functions. In one embodiment, cameras 160 may track a position and/or an orientation of user input device 130. The information regarding the position (including the orientation) of the user input device 130 provided by the one or more sensors 160 may be used to perform 3D tracking of the user input device 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination. System 100A may also include a caddy 170 to store user input device 130. Caddy 170 may also be used to calibrate the orientation of the stylus to a known roll, pitch, and yaw, and so may be in a fixed position relative to cameras 160.

In one embodiment, the system 100A may be configured to couple to a network, such as a wide area network, via an input. The input may be configured to receive data (e.g., image data, video data, audio data, etc.) over the network from a system similar to system 100A. In other embodiments, a tracking system may include cameras 160. Cameras 160 may be configured to provide visual information regarding a user (e.g., such that a POV, e.g., the position (including the orientation), of the user may be determined or such that a position of the user's hand may be determined). However, it should be noted that any type of various tracking techniques or devices may be used as desired. Note that as used herein, POV of a user refers to the perspective or POV from which a user optically views a virtual object or image, i.e., a user's visual POV, and thus is defined with respect to the display device of the system. In some embodiments, the POV may be a 6 degree of freedom (6DOF) POV, e.g., three location coordinates and three orientation coordinates, although any POV may be used as desired, e.g., three location coordinates and two or three orientation coordinates, and so forth. As noted above, position coordinates may include both location and orientation coordinates.

Note that in some embodiments, the tracking system may rely at least in part on the components of chassis 110A to determine a position or a POV, e.g., via execution of one or more programs by or on a processor or functional unit of chassis 110A, although in other embodiments the tracking system may operate independently, e.g., may have its own processor or functional unit.

In certain embodiments, the system may include components implementing a perspective-based image capture system, for capturing images of a target object at a location remote from the system. For example, the perspective-based image capture system may include an input configured to couple to a network for receiving information regarding a point of view (POV) from a tracking system at a remote location. The information regarding the POV may indicate a position of a remote user. The perspective-based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display(s) 150. A view of the 3D scene may be presented based on the virtual viewpoint, either by one or more of the displays 150 or another display, as desired. This view of the 3D scene may be stereoscopic or monoscopic, as desired.

A 3D scene generator (e.g., content processing system) stored and executed in the chassis 110A may be configured to dynamically change the displayed images provided by the display(s) 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit, procedure, and/or fiducial markers to ensure proper mapping of the peripheral device to the display images and proper mapping between the projected images and the virtual images stored in the memory of the chassis 110A.

Thus, the system 100A may present a 3D scene with which the user may interact in real time. The system may include real-time electronic display(s) 150 that may present or convey perspective images in the open space, and user input device 130 that may allow the user to interact with the 3D scene with hand controlled or hand-held tools. The system 100A may also include means to manipulate the displayed image in various ways, such as magnification, zoom, rotation, or movement, or even to display a new image. However, as noted above, in some embodiments, the system may facilitate such manipulations via the user's hands, e.g., without hand-held tools.

Further, while the system 100A is shown as including horizontal display 150B because it simulates the user's visual experience with the horizontal ground, other viewing surfaces may offer similar 3D illusion experiences. For example, the 3D scene may appear to be hanging from a ceiling by projecting the horizontal perspective images onto a ceiling surface, or may appear to be floating from a wall by projecting horizontal perspective images onto a vertical wall surface. More generally, any other variations in display orientation and perspective (or any other configuration of the system 100A) may be used as desired.

According to various embodiments of the present disclosure, the display 150 may display various types of information (for example, multimedia data or text data) to be provided to the user. The display 150 may be configured to include a liquid crystal display (LCD), a light emitting diode (LED) display, an organic LED (OLED) display, a plasma cell display, an electronic ink array display, an electronic paper display, a flexible LCD, a flexible electrochromic display, or a flexible electro wetting display. The display 150 may be connected functionally to an element(s) of the electronic device. Also, the display 150 may be connected functionally to an electronic device(s) other than the electronic device.

In the exemplary embodiment of FIG. 3B, computer system 100B may include chassis 110B which may include display 150, keyboard 120, trackpad or touchpad 135, and at least two cameras 160. The computer system 100B may also include user input device 130 and eyewear 140. Note that in some embodiments, computer system 100B may be wireless or mobile station, e.g., such as a wireless station 106 further described below. For example, computer system 100B may be or included on mobile telephones or smart phones (e.g., iPhone™, Android™-based phones), tablet computers (e.g., iPad™, Samsung Galaxy™, etc.), laptop computers (e.g., MacBook™), portable gaming devices (e.g., Nintendo DS™, PlayStation Portable™, Gameboy Advance™, iPhone™), portable Internet devices, and/or other handheld devices. In various embodiments, at least one of the displays 150 may be a stereoscopic display. It is noted that a stereoscopic display may also be configured to display two-dimensional (2D) objects and may be configured to operate in a 2D mode.

The chassis 1101B may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments, the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. For example, the computer system may include a tracking system that may track one or more of a user's head, a user's hand, or the stylus. Additionally, the memory medium may store operating system software, as well as other software for operation of the computer system. Various embodiments further include receiving or storing instructions and/or data implemented in accordance with the foregoing description upon a carrier medium.

As indicated above, the computer system 100B (or more specifically, chassis 110B) may be configured to display a three-dimensional (3D) scene (e.g., via stereoscopic images), or 3D content, such as scene 180, using the display 150. The computer system 100B may also be configured to display a "view" of the 3D scene using the display 150. The "view" of the 3D scene, or content, may refer to a displayed portion of the 3D scene from a viewpoint within the 3D scene. A viewpoint within the 3D scene may be referred to as a "virtual viewpoint." The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

In some embodiments, the display 150 may present a 3D scene for the user. This 3D scene may be considered or referred to as an illusion or simulated 3D because the actual provided images are 2D, but the scene is conveyed in 3D via the user's interpretation of the provided images via stereoscopic effects. In order to properly view the stereoscopic images (one for each eye for each image frame), the user may wear eyewear 140. Eyewear 140 may be any of anaglyph glasses, polarized glasses, shutter glasses, lenticular glasses, etc., among others.

In some embodiments, eyewear 140 may be used as a position input device to track the user view (e.g., eyepoint or point of view (POV)) of a user viewing a 3D scene presented by the system 100B. For example, eyewear 140 may provide information (e.g., position information, which includes orientation information, etc.) that is usable to determine the position of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position data suitable for the head tracking. The input device(s), such as a stylus, keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position of the display 150 and the point of view of the user may be used to map a portion of the virtual space to the physical space of the system 100B. In essence, the physical space and components used may be mapped to the virtual model in order to accurately render a 3D scene of the virtual space.

One or more of the user input devices (e.g., the keyboard 120, the trackpad 135, the user input device 130, pointing device, user control device, user hand/fingers, etc.) may be used to interact with the presented 3D scene. For example, the user input device 130 (shown as a passive stylus) or simply the user's hands may be used to directly interact with virtual objects of the 3D scene (via the viewed projected objects). Such direct interaction may be possible with negative space portions of the 3D scene. In some embodiments, at least a portion of the 3D scene may be presented in this negative space, which is in front of or otherwise outside of the at least one display, via stereoscopic rendering (of the 3D scene). In some embodiments, at least a portion of the 3D scene may appear as a hologram-like image above the surface of the display 150. It should be noted, however, that a portion of the 3D scene may also be presented as appearing behind the display surface, which is in positive space Thus, negative space refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, negative space may be considered to be a "hands-on volume" as opposed to an "inner-volume" (i.e., positive space), which may be under the surface of the display(s), and thus not accessible. Thus, the user may interact with virtual objects in the negative space because they are proximate to the user's own physical space. Said another way, the positive space is located behind (or under) the viewing surface, and so presented objects appear to be located inside (or on the back side of) the physical viewing device. Thus, objects of the 3D scene presented within the positive space do not share the same physical space with the user and the virtual objects therefore cannot be directly and physically manipulated by hands or physically intersected by hand-held tools such as user input device 130. Rather, they may be manipulated indirectly, e.g., via a computer mouse, a joystick, virtual representations of hands, handheld tools, or a stylus, or by projections from the stylus (e.g., a virtual laser or a virtual plane).

In some embodiments, system 100 may include one or more sensors 160. The one or more sensors 160 may be included in a tracking system. FIG. 3B illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Alternatively, fewer than four sensors may be used (e.g., two sensors), wherein each sensor may track both the user (e.g., the user's head and/or the user's point of view) and the user input device. Sensors 160 may be used to image a user of system 100B, track a user's movement, or track a user's head or eyes, among other contemplated functions. In one embodiment, cameras 160 may track a position and/or an orientation of user input device 130. The information regarding the position (including the orientation) of the user input device 130 provided by the one or more sensors 160 may be used to perform 3D tracking of the user input device 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination.

In some embodiments, the system 100B may be configured to couple to a network, such as a wide area network, via an input or interface (wired or wireless). The input may be configured to receive data (e.g., image data, video data, audio data, etc.) over the network from a system similar to systems 100A or 100B. In other embodiments, a tracking system may include cameras 160. Cameras 160 may be configured to provide visual information regarding a user (e.g., such that a POV, e.g., the position (including the orientation), of the user may be determined or such that a position of the user's hand may be determined). However, it should be noted that any type of various tracking techniques or devices may be used as desired. Note that as used herein, POV of a user refers to the perspective or POV from which a user optically views a virtual object or image, i.e., a user's visual POV, and thus is defined with respect to the display device of the system. In some embodiments, the POV may be a 6 degree of freedom (6DOF) POV, e.g., three location coordinates and three orientation coordinates, although any POV may be used as desired, e.g., three location coordinates and two or three orientation coordinates, and so forth. As noted above, position coordinates may include both location and orientation coordinates.

Note that in some embodiments, the tracking system may rely at least in part on the components of chassis 110B to determine a position or a POV, e.g., via execution of one or more programs by or on a processor or functional unit of chassis 110B, although in other embodiments the tracking system may operate independently, e.g., may have its own processor or functional unit.

In certain embodiments, the system may include components implementing a perspective-based image capture system, for capturing images of a target object at a location remote from the system. For example, the perspective-based image capture system may include an input configured to couple to a network for receiving information regarding a point of view (POV) from a tracking system at a remote location. The information regarding the POV may indicate a position of a remote user. The perspective-based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display 150. A view of the 3D scene may be presented based on the virtual viewpoint, either by one or more of the display 150 or another display, as desired. This view of the 3D scene may be stereoscopic or monoscopic, as desired.

A 3D scene generator (e.g., content processing system) stored and executed in the chassis 110B may be configured to dynamically change the displayed images provided by the display 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit, procedure, and/or fiducial markers to ensure proper mapping of the peripheral device to the display images and proper mapping between the projected images and the virtual images stored in the memory of the chassis 110B.

Thus, the system 100B may present a 3D scene with which the user may interact in real time. The system may include real-time electronic display 150 that may present or convey perspective images in the open space, and user input device 130 that may allow the user to interact with the 3D scene with hand controlled or hand-held tools. The system 100B may also include means to manipulate the displayed image in various ways, such as magnification, zoom, rotation, or movement, or even to display a new image. However, as noted above, in some embodiments, the system may facilitate such manipulations via the user's hands, e.g., without hand-held tools.

According to various embodiments of the present disclosure, the display 150 may display various types of information (for example, multimedia data or text data) to be provided to the user. The display 150 may be configured to include a liquid crystal display (LCD), a light emitting diode (LED) display, an organic LED (OLED) display, a plasma cell display, an electronic ink array display, an electronic paper display, a flexible LCD, a flexible electrochromic display, or a flexible electro wetting display. The display 150 may be connected functionally to an element(s) of the electronic device. Also, the display 150 may be connected functionally to an electronic device(s) other than the electronic device. According to various embodiments of the present disclosure, the input module 240 may receive an input for controlling an attribute of, for example, a history screen. The input module 240 may receive, for example, an input of 'reference screen setting'. 'Reference screen setting' may involve an operation for storing information related to the screen in the storage module 210 in order to display the reference screen. The input module 240 may receive, for example, an input for displaying the reference screen. Attributes of the screen may include, for example, at least one of the positions of the reference screen, a sound volume for the reference screen, brightness of the screen, and the size of the screen. If the input module 240 is included in a second electronic device, the input module 240 may not be provided in the electronic device according to various embodiments of the present disclosure.

Figure 4:
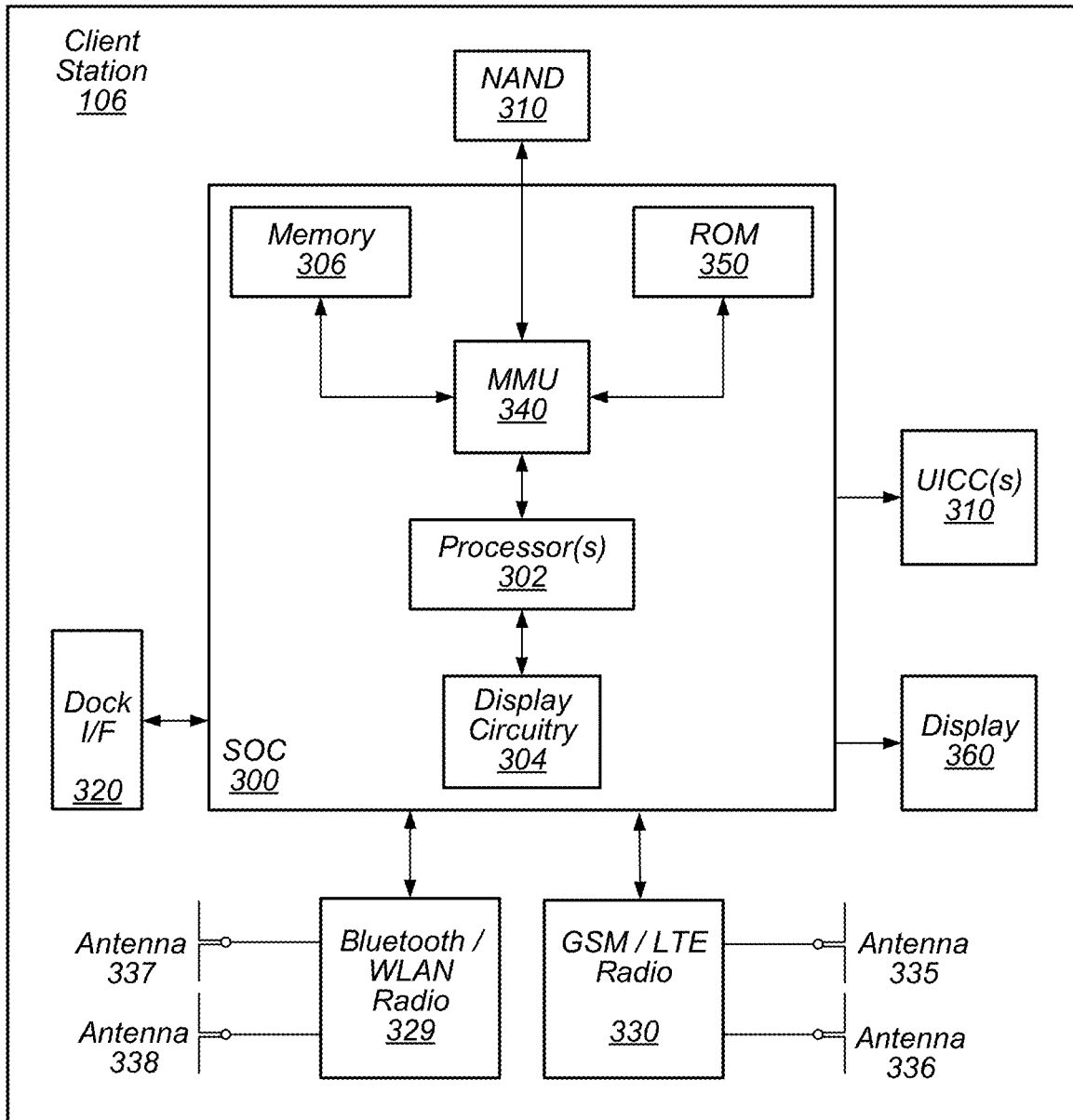
FIG. 4 illustrates an example block diagram of a user equipment device configured according to some embodiments.

FIG. 4 illustrates an example simplified block diagram of a wireless station 106. According to embodiments, wireless station 106 may be a user equipment (UE) device, a mobile device and/or mobile station. Wireless station 106 may be used in conjunction with the system described above in reference to FIGS. 3A and 3B and the systems described below in reference to FIGS. 5B and 5C. For example, wireless station 106 may be configured as an input device to any of the described systems (e.g., wireless station 106 may be configured as a user input device). As another example, according to some embodiments, wireless station 106 may be configured as a display of any of the described systems. Thus, wireless station 106 may be configured to display a stereoscopic image. In some embodiments, wireless station 106 may be configured to communicate with a 3D system either wirelessly (e.g., via a local area network such as a Wi-Fi, Bluetooth, or Bluetooth low energy connection) or via a wired interface such as a universal serial bus interface, among other wired interfaces. In some embodiments, wireless station 106 may be included in a computer system, such as computer system 100B described above.

As shown, the wireless station 106 may include a system on chip (SOC) 300, which may include portions for various purposes. The SOC 300 may be coupled to various other circuits of the wireless station 106. For example, the wireless station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The wireless station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the wireless station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As described herein, the wireless station 106 may include hardware and software components for implementing the features described herein, e.g., the wireless station 106 may form at least part of a 3D display system such as system 100 described above and/or systems 500A and 5B described below. For example, the processor 302 of the wireless station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Figure 5A:
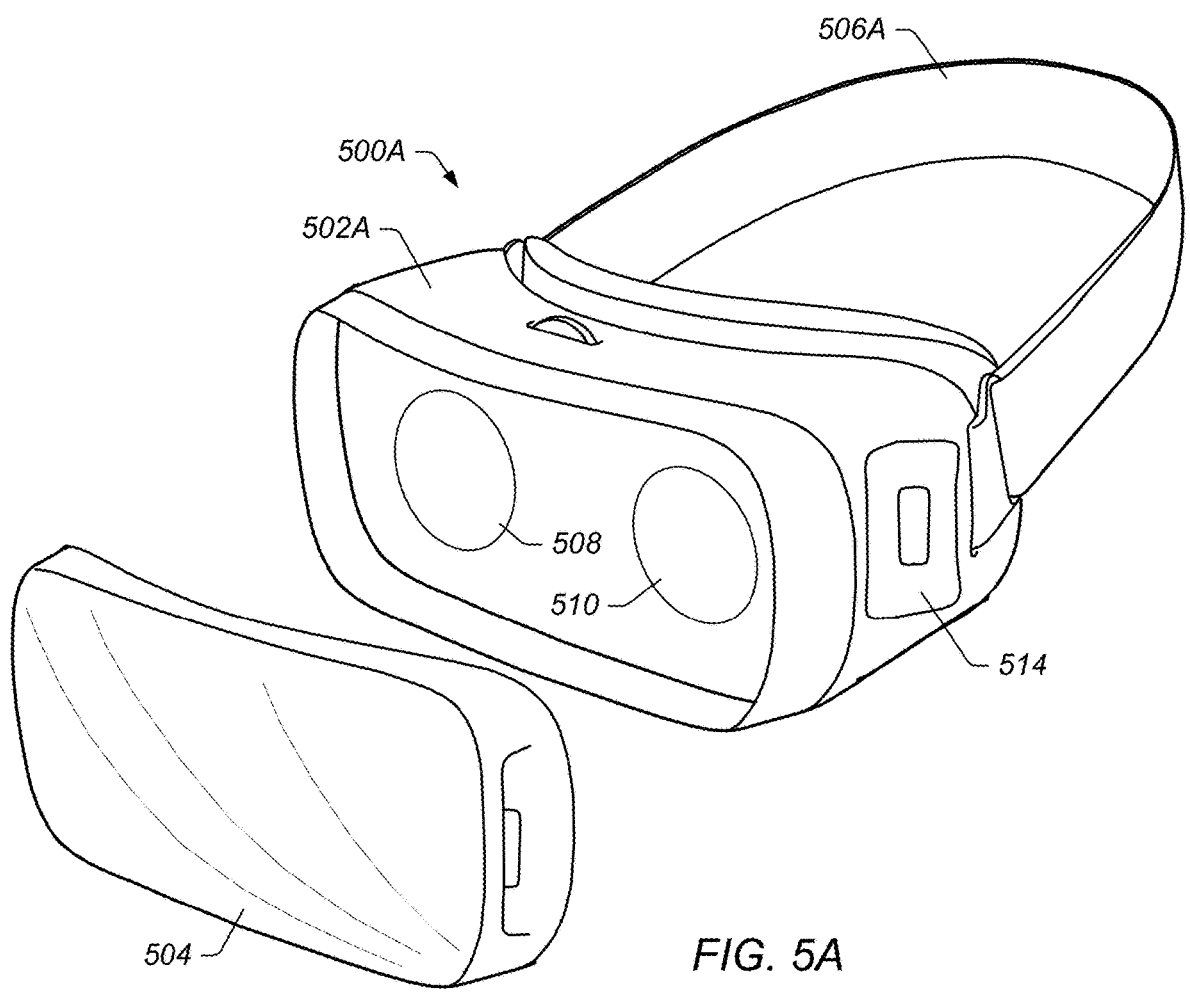
FIGS. 5A and 5B illustrate examples of a 3D head-mounted stereoscopic display system configured according to some embodiments.

Referring to FIG. 5A, a head-mounted electronic device 500A may include a body 502A and a cover 504. The body 502 may include lenses 508 and 510, and a control device

514. In addition, electronic device 500A may include a support 506A which may be configured to support electronic device 500A on a user's head. Lenses 508 and 510 may be positioned to correspond to eyes of a user. The user may view a screen on a display through lenses 508 and 510. The display may be coupled or connected to electronic device 500. In some embodiments, the display may be included on (or in) cover 504 and cover 504 may be configured to couple to body 502A. In some embodiments, electronic device 500B may include a display, such as display 150A or 150B described above in reference to FIG. 4. Thus, cover 504 may be communicatively coupled to body 502A (e.g., to couple a display of cover 504 to a processor of electronic device 500) and mechanically coupled (e.g., attached to) body 502. In some embodiments, the communicative coupling between body 502A and cover 504 may be wired and/or wireless.

In some embodiments, control device 514 may be located on a side surface of body 502A. Control device 514 may be used for the user to enter an input for controlling the head-mounted electronic device 500A. For example, control device 514 may include a touch panel, a button, a wheel key, and/or a touch pad. The touch panel may receive the user's touch input. The touch input may be a direct touch input to the touch panel or a hovering input in the vicinity of the touch panel.

Figure 5B:
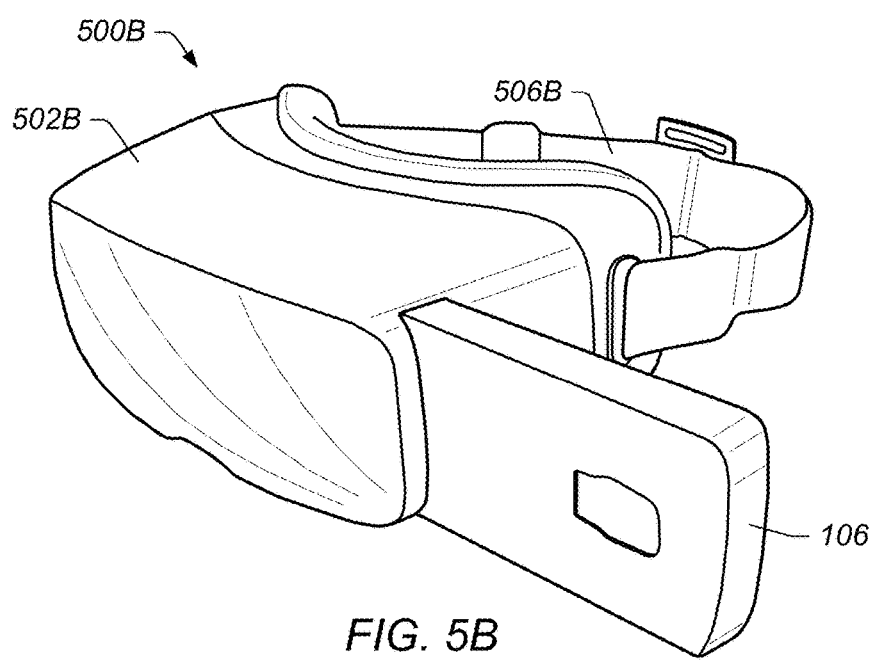

Turning to FIG. 5B, a head-mounted electronic device 500B may include a body 502B and a support 506B. Body 502B may be configured to couple to a wireless station and a display of electronic device 500B may be a display of a wireless station, such as wireless station 106, and the wireless station may be coupled or connected to (e.g., may be detachably mounted to) electronic device 500B. In other words, electronic device 500B may be configured such that a wireless station may be non-permanently coupled to, and removable without destructive measures, to electronic device 500B. Thus, electronic device 500B may be coupled to and decoupled from (e.g., non-destructively decoupled from) a wireless station without a change in functionality of the wireless station or electronic device 500B.

Figure 5C:
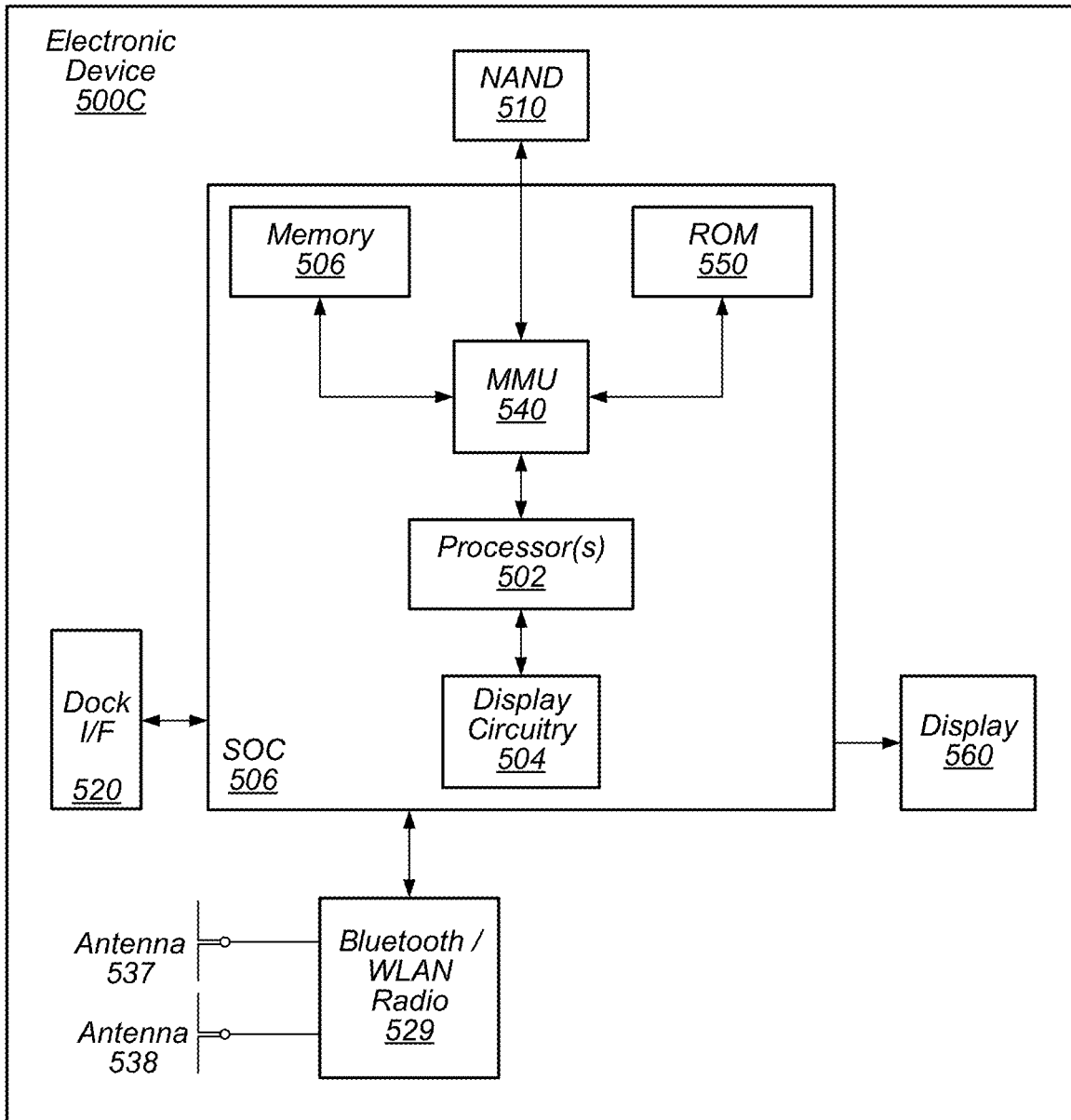
FIG. 5C illustrates an example block diagram of a head-mounted electronic device configured according to some embodiments.

Turning to FIG. 5C, FIG. 5C illustrates an example simplified block diagram of a head-mounted electronic device 500C. According to embodiments, electronic device 500C may be include a display (e.g., such as electronic device 500A) or may be configured to couple to wireless station (e.g., such as electronic device 500B). Note that electronic devices 500A and 500B described above may include at least portions of the features described in reference to electronic device 500C.

As shown, the electronic device 500C may include a system on chip (SOC) 506, which may include portions for various purposes. The SOC 506 may be coupled to various other circuits of the electronic device 500C. For example, the electronic device 500C may include various types of memory (e.g., including NAND flash 510), a connector interface (I/F) (or dock) 520 (e.g., for coupling to a computer system, dock, charging station, external display, etc.), the display 560 (note that is some embodiments, electronic device 500C may not include display 560), and short to medium range wireless communication circuitry 529 (e.g., Bluetooth™ and WLAN circuitry). The short to medium range wireless communication circuitry 529 may also couple to one or more antennas, such as antennas 537 and 538 as shown. The short to medium range wireless communication circuitry 529 may include multiple receive chains and/or multiple transmit chains for receiving and/or transmitting multiple spatial streams, such as in a multiple-input multiple output (MIMO) configuration.

As shown, the SOC 506 may include processor(s) 502, which may execute program instructions for the electronic device 500C and display circuitry 504, which may perform graphics processing and provide display signals to the display 560 (and/or to dock 520). The processor(s) 502 may also be coupled to memory management unit (MMU) 540, which may be configured to receive addresses from the processor(s) 502 and translate those addresses to locations in memory (e.g., memory 506, read only memory (ROM) 550, NAND flash memory 510) and/or to other circuits or devices, such as the display circuitry 504, short range wireless communication circuitry 529, connector interface (I/F) 520, and/or display 560. The MMU 540 may be configured to perform memory protection and page table translation or set up. In some embodiments, the MMU 540 may be included as a portion of the processor(s) 502.

In some embodiments, electronic device 500C (and/or an electronic device such as electronic device 500A or 500B) may be in communication with a user input device, such as user input device 130 described above. In some embodiments, the electronic device may receive user input via user input device 130 as described above.

In addition, in some embodiments, electronic device 500C may include one or more positional sensors such as accelerometers, gyroscopic sensors, geomagnetic sensors, magnetic sensors, proximity sensors, gesture sensors, grip sensors, and/or biometric sensors. In some embodiments, the electronic device may acquire information for determining a motion of a user wearing the electronic device and/or whether a user wears or removes electronic device 500C, using the one or more positional sensors. The at least one processor may control execution of a function(s) or an operation(s) corresponding to an input received through a control device (for example, control device 514 and/or user input device 130) in response to a received input.

As described herein, the electronic device 500C may include hardware and software components for implementing the features described herein, e.g., the electronic device 500C may form at least part of a 3D display system such as system 100 described above and/or systems 500A and 5B described below. For example, the processor 502 of the electronic device 500C may be configured to implement part or all of the features described herein, e.g., by executing program instructions stored on a memory medium (e.g., a non-transitory computer-readable memory medium). Alternatively (or in addition), processor 502 may be configured as a programmable hardware element, such as an FPGA (Field Programmable Gate Array), or as an ASIC (Application Specific Integrated Circuit). Alternatively (or in addition) the processor 502 of the UE 106, in conjunction with one or more of the other components 500, 504, 506, 510, 520, 535, 550, 560 may be configured to implement part or all of the features described herein.

In some embodiments, electronic device 500C may include or be in communication with one or more external cameras. For example, electronic device 500C may include (or be in communication with) one or more cameras (or an array of cameras) that may be configured to capture images of a physical location of a user.

In addition, as described herein, processor 502 may include one or more processing elements. Thus, processor 502 may include one or more integrated circuits (ICs) that are configured to perform the functions of processor 502. In addition, each integrated circuit may include circuitry (e.g., first circuitry, second circuitry, etc.) configured to perform the functions of processor(s) 502.

Figure 6:
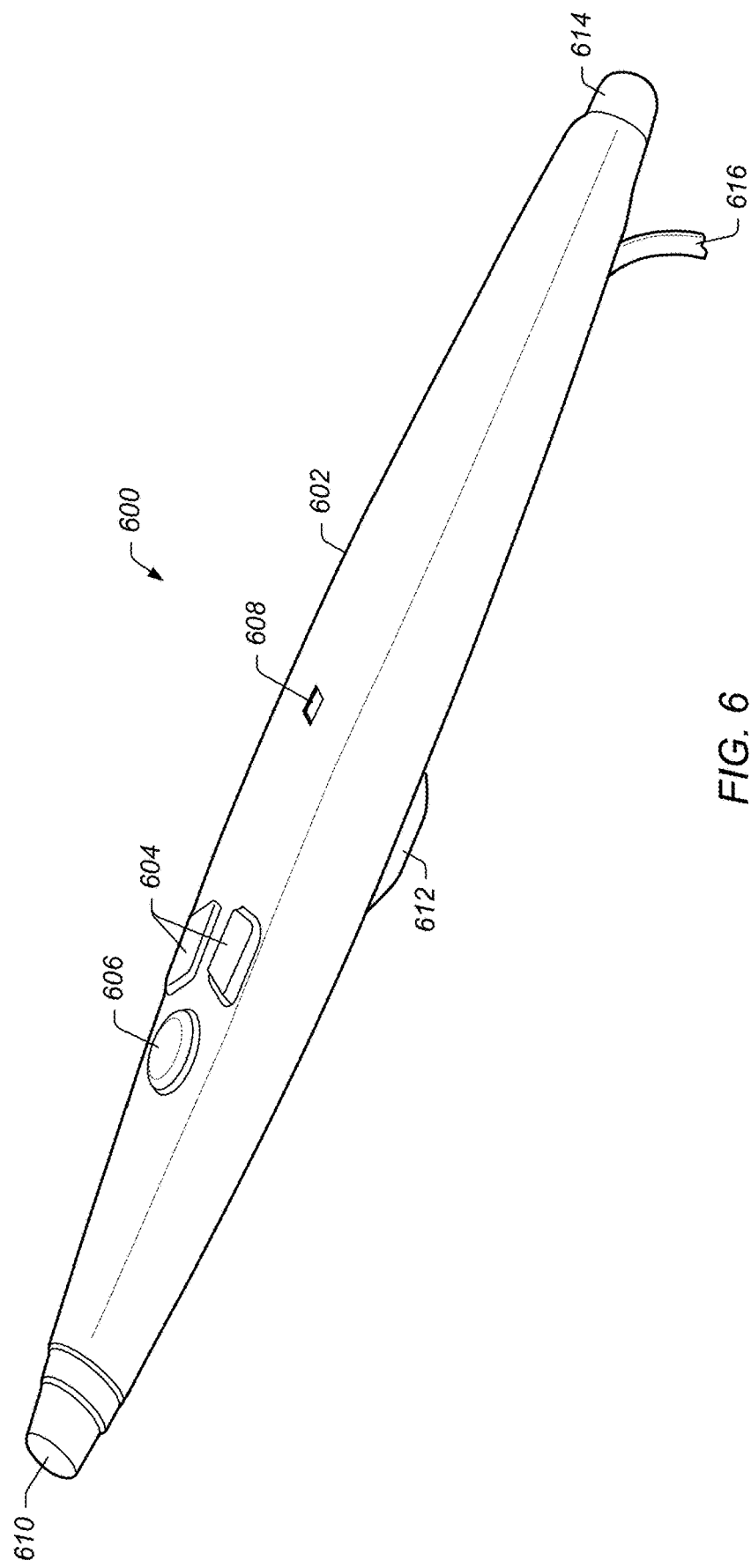
FIG. 6 illustrates an example of a user input device, according to some embodiments.

FIG. 6 illustrates an example of a user input device, according to some embodiments. As shown, a user input device 600 may be configured to perform various embodiments as described herein. User input device 600 may be similar to or the same as user input device 130 as described above in reference to FIGS. 4 and 5B-5C. Thus, user input device 600 may be used in conjunction with, or be included in, systems 100A-B and/or systems 500A-B. As described above, systems 100A-B and/or systems 500A-B may have the capability to determine the six-axis position and orientation of user input device 600. Note that this includes the X, Y, Z location of tip 610 of user input device 600 and the a, 3, y angular orientation of body 602 of user input device 600. However, it should be further noted that user input device 600 is exemplary, and that other user input devices, suitably configured, may be used as desired.

As shown, user input device 600 may include buttons 604, 606, and 612. In some embodiments, the buttons 604, 606, and/or 612 may be faux (or dummy) buttons. In other words, buttons 604, 606, and/or 612 may be non-functioning buttons, e.g., a system, such as systems 100A-B and/or 500A-B described herein, may detect a user action of pressing a location of user input device 600 identified by the system as a button location. Hence, in some embodiments, buttons 604, 606, and/or 612 may be identifiable locations (e.g., via a visible marker, a raised area, and/or a dimpled or depressed area). In some embodiments, one of the buttons, such as button 606, may be "depressed" and "held down" to trigger the selection of a virtual object within a 3D scene presented by any of systems 100A-B and/or 500A-B. Additionally, system 100 may be configured to display a virtual "laser like" projection from tip 610 to the selected object. With the virtual object selected, adjustment of the position and/or orientation of user input device 600 may change the position and/or orientation of the virtual object. Thus, movements of the user input device 600 may result in corresponding translations and/or rotations of the virtual object.

Probabilistic Element Selection

In a majority of existing implementations, user interface systems assign a binary (e.g., yes or no), static, geometric region to visual elements for the purposes of detecting which element(s) a user intends an input to activate and which element(s) a user does not intend to activate. This binary region is often called the "hit region" of an element. Such hit regions often correspond exactly to the shape and size of the visual representation of the element. However, this is a simplistic and thus limited approach. A fundamental goal of a graphical user interface (GUI) may be to permit the user to quickly and accurately instruct the GUI which visual element(s) the user knows in his or her head that he or she wishes to activate; in a GUI, this may be done via visibly distinct, activatable virtual elements used in conjunction with a user input device.

Binary, static hit regions have inherent limitations. For instance, the context of the presentation of the element on the display may require the element to appear visually small; however, if the hit region is also small, the user may experience false negatives when attempting to activate the element or be forced to expend more mental energy to avoid false negatives.

In using some 2D display systems in which the input device is a conventional mouse, trackpad, track ball, or the like, the cursor may be rapidly and accurately navigated to a chosen virtual object and the virtual object selected with little error. The reason for this is, in part, that the input device and the user's hand/arm are steady because they are supported by a surface, such as a table top.

In a 3D display system (and some 2D display systems), a common means of input may be a 6-degree of freedom stylus, controller, and/or tracked finger or hand of the user. The "cursor" is at the end of a virtual laser beam that extends from the tip of the tracked device, and may be coaxial with the pointing axis of the device. One feature of the use of such a device is that the user's arm is typically not supported but, rather, suspended in the air. This makes it somewhat more difficult to designate a virtual object, especially if the virtual object is small, or if it is one of several densely packed objects, or if the user has neuromotor limitations. The fact that the cursor is at the end of a "lever arm" means that small movements in the user's hand are magnified into larger movements of the cursor. This second effect also makes it more difficult to accurately designate virtual objects.

Embodiments described herein provide methods and mechanisms to enhance the ease and accuracy of selecting virtual objects (e.g., user interface (UI) elements, UI items (e.g., a virtual object within a tool bar and/or tool box), virtual models, and so forth) in the user interface (e.g., virtual scene) of a 3D (and 2D) display system. In some embodiments, probabilistic element selection (e.g., of virtual objects) may be based on abandoning binary hit regions and, instead, adopting probabilistic hit regions. In other words, a numerical probability model may be defined whereby, given a current arrangement of a plurality of virtual objects elements in a virtual space, a vector of probability values (e.g., each value may range from 0%-100%) may be assigned to each possible state of the current configuration of input devices. Such a schemed may lower false negative rates (e.g., lower rates at which an element is not selected although a user intends to select that element). For example, probabilistic element selection may lead to lower false negative rates for pointing devices that tend to shift their positions during physical button presses and/or for users with physiological challenges. In addition, such a scheme lower false negative rates for small elements (e.g., for elements that occupy a relatively small area of the display). Further, such a scheme may lower false positive rates for virtual objects that are tightly packed (e.g., for situations/instances in which a plurality of virtual objects are presented to a user in a relatively small area of the display).

In some embodiments, probabilistic element selection may allow a UI designer more flexibility in creating virtual objects. For example, probabilistic element selection may allow a UI designer more freedom in designing virtual objects (e.g., because the UI designer does not have to give ease of element selection as much weight as a design criterion due to the greater efficacy of probabilistic element selection as compared to other methods in the art). For example, a UI designer may create smaller virtual objects and/or more densely packed virtual objects.

In some embodiments, probabilistic element selection may allow better perceived responsiveness and/or accuracy by users. For example, a user may perceive better system responsiveness and/or accuracy in certain scenarios, such as when the user is rushed or in a hurry, when the user is in poor tracking conditions, and/or when using a system with economical/low-cost tracking systems. Additionally, a user may perceive faster user system operation (e.g., by dynamically adjusting the user interface layout for speed where selection ambiguities are detected to be sufficiently low).

In some embodiments, probabilistic element selection may allow better accuracy toward virtual objects that are in motion (e.g. non-zero velocity), by allowing for such virtual objects' probabilities to be boosted by a factor dependent on their velocity.

As noted above, a numerical probability model may be defined whereby, given a current arrangement of a plurality of virtual objects in a virtual space, a vector of probability values (e.g., each value may range from 0%-100%) may be assigned to each possible state of the current configuration of input devices. Each probability value, e.g., of this probability vector, may represent the likelihood that the user has the intention of activating element i. A display system may use the probability vector to perform a number of operations and/or determinations. For example, in some embodiments, an element of the plurality of virtual objects that is associated with the largest likelihood above a minimum threshold (e.g., above 50%, 60%, 70%, 80%, 90%, or any other predetermined minimum threshold) may be selected as the intended activated element such that, responsive to receiving user input indicating selection of an intended element (e.g., an indication that the user has pressed a designated button on one of the input devices), the element with the largest likelihood above the minimum threshold is selected. In some embodiments, no predetermined minimum threshold may be set such that an element with the highest likelihood relative to the other virtual objects may be determined to be the intended selection regardless of the absolute value of the probability associated with that element.

In some embodiments, the display system may use the probability vector to determine whether to prompt the user of the display system to confirm a selection of one of the plurality of virtual objects. For example, if two or more elements have similar probabilities (and, in some embodiments, are above a minimum threshold), upon a user button press, a confirmation prompt may appear, asking the user to confirm his or her selection as between the two or more elements.

In some embodiments, the display system may use the probability vector to adjust an arrangement of the virtual objects. For example, if the probability vector indicates that two or more virtual objects are competing (i.e., have relatively high probabilities), the element layout (e.g., locally around those elements or globally for all elements) may adjust toward an arrangement that may reduce the number of competing high-probability elements (i.e., thereby reducing the likelihood of selection of false positives). For example, if the virtual cursor pointed to by the input device is in a state surrounded by four closely positioned virtual objects, those four elements may gradually animate toward a position and/or size that reduces the probabilistic competition between those elements, thereby reducing activation of false positives.

In some embodiments, if for the current input states are two or more elements with relatively low probabilities (e.g., lower than some predetermined threshold), the arrangement of the virtual objects (e.g. locally, such as in a neighborhood around the 3D cursor, or globally) may adjust toward a layout that would amplify (i.e., increase) the probabilities in the probability vector. For example, if the highest probability element is a virtual toolbox, but this probability value is within certain lower and upper bound thresholds, this virtual toolbox in the overall element layout would animate toward a new size and/or position which would amplify its probability value in the output vector.

In some embodiments, the display system may provide feedback to a user based on the probability vector. For example, feedback may be provided to the user based on the probability values corresponding to the plurality of virtual objects. In some embodiments, one or more elements with probability values at or above a first predetermined threshold value (e.g., at or above 50% probability) may be altered by the display system so as to visually indicate to the user that the first predetermined threshold value has been met or exceeded (e.g., the display system may cause the one or more virtual objects above the first threshold value to change in appearance, such as by receiving a colored glow). Additionally or alternatively, virtual objects with probability values at or above a second predetermined threshold value (e.g., at or above 90% probability) may be altered more conspicuously (e.g., more strongly) by the display system so as to indicate to the user that the second predetermined threshold value has been met or exceeded (e.g., the display system may cause the one or more virtual objects above the second threshold value to change more drastically (as compared to the virtual objects altered as a result of meeting or exceeding the first predetermined threshold value) in appearance, such as by receiving a strong colored glow. Alternatively, the extent to which the appearance of the virtual object changes may be proportional to the probability value corresponding to the virtual object (e.g., there may not be a first and second threshold value, but rather the glow surrounding the virtual object may increase in intensity as the probability value increases). Haptic feedback may indicate a probability value associated with a virtual object. For example, responsive to a user hovering over an element, the display system may adjust (e.g., increase as the probability increases) the strength of haptic feedback in a manner proportional to the element selection probability. Additionally, and/or alternatively, to the display system modifying the arrangement of the virtual objects, the display system may modify a virtual beam and/or a 3D cursor based on the probability vector. For example, if a virtual object is associated with a high probability, the virtual beam and/or 3D cursor may be visually modified to indicate the high probability, e.g., such as bending the virtual beam in the direction of the high probability virtual object, and/or bending the virtual beam to touch the high probability virtual object In some embodiments, the display system may integrate the probability vector into guided help systems of the display system. For example, if a step in a guided tutorial asks that the user activate an element in the virtual scene, yet that element's selection probability value remains low for an extended period of time, the help system may then provide an additional prompt or call to action, guiding the user more explicitly as to that step.

In some embodiments, the display system may integrate the probability vector with advertising systems of the display system. For example, the display system may record the selection probability (e.g., the average selection probability, instantaneous selection probability associated with an event, and/or the selection probability as a function of time) of an element in the virtual scene that corresponds to a 2D or a 3D advertising element. This recording may be integrated with an advertising analytics system for measuring ad element design efficacy.

Figure 7:
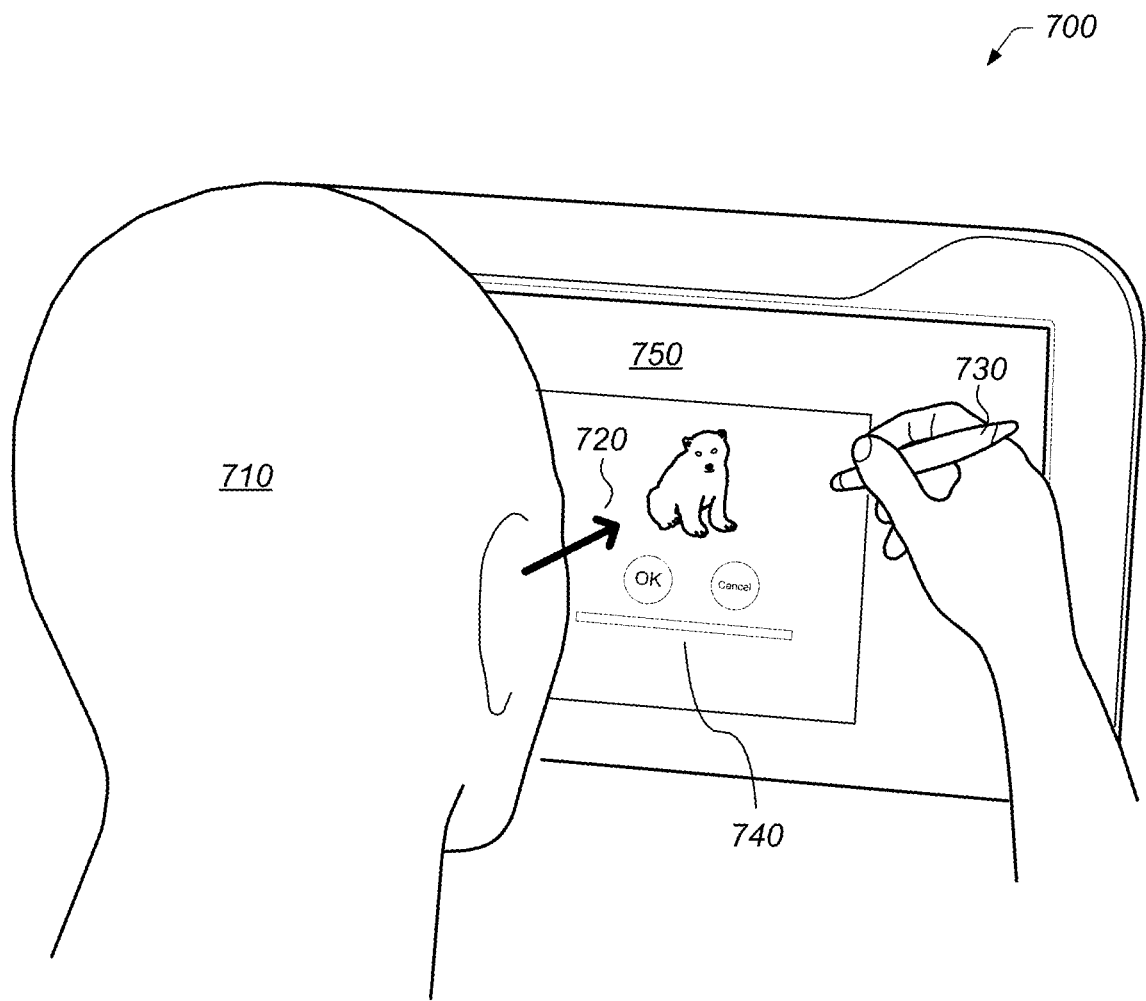
FIG. 7 illustrates an example of a user interacting with a display system, according to some embodiments.

FIG. 7 illustrates an example of a user interacting with a display system, according to some embodiments. Display system 700 (which may be any of the above described display systems) may include stylus 730 (or any other user input device) and display 750. One or more virtual objects 740 may be presented on display 750, which may be located in the direction of the user's gaze 720. For example, the display may present to user 710 a scroll bar, a plurality of buttons, such as an 'OK' button and/or a 'Cancel' button, and a 3D representation of an object, such as an animal as shown in FIG. 7. To determine the probability vector as described above, the display system may use as inputs to the probability model: (a) user head state (e.g., position and orientation), (b) eye state (e.g., gaze direction), (c) a mid-air stylus device (e.g., position and orientation), and (d) a stylus ray-cast terminus position (position). The available virtual objects may include (i) a first button, such as an 'OK' button, (ii) a second button, such as a 'Cancel' button, (iii) a scroll bar, and (iv) a 3D model of an animal. In this example, the input vector to the probability model may be <head_position (xyz), head_orientation(xyz), eye_gaze(xy), stylus_position (xyz), stylus_orientation(xyz), stylus_raycast terminus_position(xyz)> (which amounts to 17 numerical values), and the output vector of this probability model may be <intention_ok, intention_cancel, intention_scrollbar, intention_animal> (which amounts to 4 numerical values).

Structurally, time-based data may also be incorporated for greater accuracy. In some embodiments, this may include a recurrent feed of some number of previous time-tagged output(s) as additional input vector elements when querying the probability model for outputs. In other words, in addition to the input vector listed above, additional input elements may include one or more previous time-tagged output(s). The resulting input vector may resemble <head_position (xyz), head_orientation(xyz), eye_gaze(xy), stylus_position (xyz), stylus_orientation(xyz), stylus_raycast_terminus_position(xyz), last_intention_ok, last_intention_cancel, last_intention_scrollbar, last_intention_animal>. Alternatively, and/or additionally, to the positional input elements discussed above, the display system may be provided (or may compute) current translational and/or rotational velocities of the input elements. These additional input elements may expand the input vector further. The resulting input vector may resemble <head_position(xyz), head_position_velocity(xyz), head_orientation(xyz), head_orientation_velocity(xyz), eye_gaze(xy), eye_gaze_velocity(xy), stylus_position(xyz), stylus_position_velocity(xyz), stylus_orientation(xyz), stylus_orientation_velocity(xyz), stylus_raycast_terminus_position(xyz)>. Recurrent links and velocity information may assist with preventing activation false positives.

In some embodiments, the display system may include the button state and/or windowed button state of the stylus (i.e., if any button press occurred within a predetermined period of time) in the input vector. For example, this input may be a binary input (e.g., "0" indicates an un-pressed button and "1" indicates a pressed button or recently pressed button). The input vector in this case may resemble <head_position (xyz), head_orientation(xyz), eye_gaze(xy), stylus_position (xyz), stylus_orientation(xyz), stylus_raycast_terminus_position(xyz), stylus_buttons(abc)>.

In some embodiments, the display system may include user attributes (e.g., age, sex, gender, handedness, nationality, user experience level of the user for the current application and/or display system (e.g., total hours logged, average number of hours logged per unit time, or the like)) as inputs. The display system may use outputs from computer visions systems (e.g., operating on imagery from the user's webcam) as inputs to the probability model. Outputs from computer visions systems may include identification of the presence of objects around the user, the user's mood, a number of users that are viewing and/or directing the operation of the display system, lighting conditions, and the like.

In some embodiments, the display system may include low-level tracking system health and/or status as inputs to the probability model. For example, the inputs may include live confidence values of the tracking systems (e.g., as a function of lightning conditions and environment obstructions) and/or computation latency of the tracking systems (e.g., as a function of current hardware capabilities and load).

In some embodiments, the display system may use outputs from other personal devices as inputs to the probability model. For example, the display system may use accelerometer data from the user's mobile device and/or biometrics from the user's wristwatch, smartwatch, fitness tracker, and so forth. In some embodiments, the display system may pre-process the inputs prior to introduction to the probability model for training and/or querying. For example, the display system may use filtering, such as spatial-temporal filtering, to improve the quality of the data input into the probability model. That is, the filtering may be used to reduce and/or remove certain frequencies, such as noise frequencies or biological or physiological frequencies (such as those that may be introduced by user tremor). Sensors within the stylus (e.g., one or more accelerometer) may be used to physically detect undesirable frequencies in the input data. By either means of input, the effects of jitter can be minimized by having the software average out or filter out the slight, rapid variations in the designated spot and designate only and continuously the intended spot. The dynamically tuning filter may operate within specialized spectra, such as according to biomechanically understood constraints (e.g., constraints on human heart rate and muscle activation). Moreover, statistical correlations of jitter characteristics with individual user profiles, length of the session, and/or total energy estimated spent by the user in operating the hand held stylus may be integrated in the configuration of the jitter filter. According to some embodiments, these dynamic tunings may vary the filter configuration over time (e.g., intra- or inter-session).

In addition to the output vector of the probability model discussed above (e.g., an output vector that includes <intention_ok, intention_cancel, intention_scrollbar, intention_animal>), a secondary set of outputs may be produced from the probability model. The secondary set of outputs may include one or more values associated with attributes of the user(s). For example, these user attribute may include one or more of the following user attributes: (a) mood, (b) demographics (e.g., age, gender, sex, nationality, and the like), (c) heart-rate, (d) handedness, (e) whether the user is sharing or demonstrating with/for other people (e.g., as opposed to operating the system alone), (f) mental confusion, (h) experience level with the application and/or display system, (i) eye/gaze direction (e.g., if absent as an input to the probability vector), (h) favorableness of environment lighting conditions (e.g., for tracking).

In some embodiments, one or more computational models may be used with the probability model. In other words, the probability model may be configured, trained (e.g., online and/or offline), and/or computed using one or more general computational models. For example, general computations models that may be used with the probability model may include one or more of the following computational models: neural network, recurrent neural network, oscillating neural network, Bayesian network, dynamic Bayesian network, decision tree, decision forest, hidden Markov model, Gaussian mixture model, Markov random field.

The probability model may be artificially constructed and/or may be trained from sessions with human users. The probability model may have a global configuration and/or may be application-specific (e.g., the display system may associate one or more applications with an application-specific probability model). According to some embodiments, after the probability model has been preconfigured, the model may adapt dynamically (e.g., via online learning) and/or may adapt separately for different individual users. Training the probability model prior to normal operation may incorporate additional input devices into the inputs of the probability model, although these additional input devices may be absent during one or more operation sessions (e.g., during normal operation). For example, eye/gaze input and/or heart rate meters may be present during model training but absent during one or more normal operation sessions. According to some embodiments, preconfigured models may adapt globally based on the aggregation of dynamically trained models' states from end-users.

Figure 8:
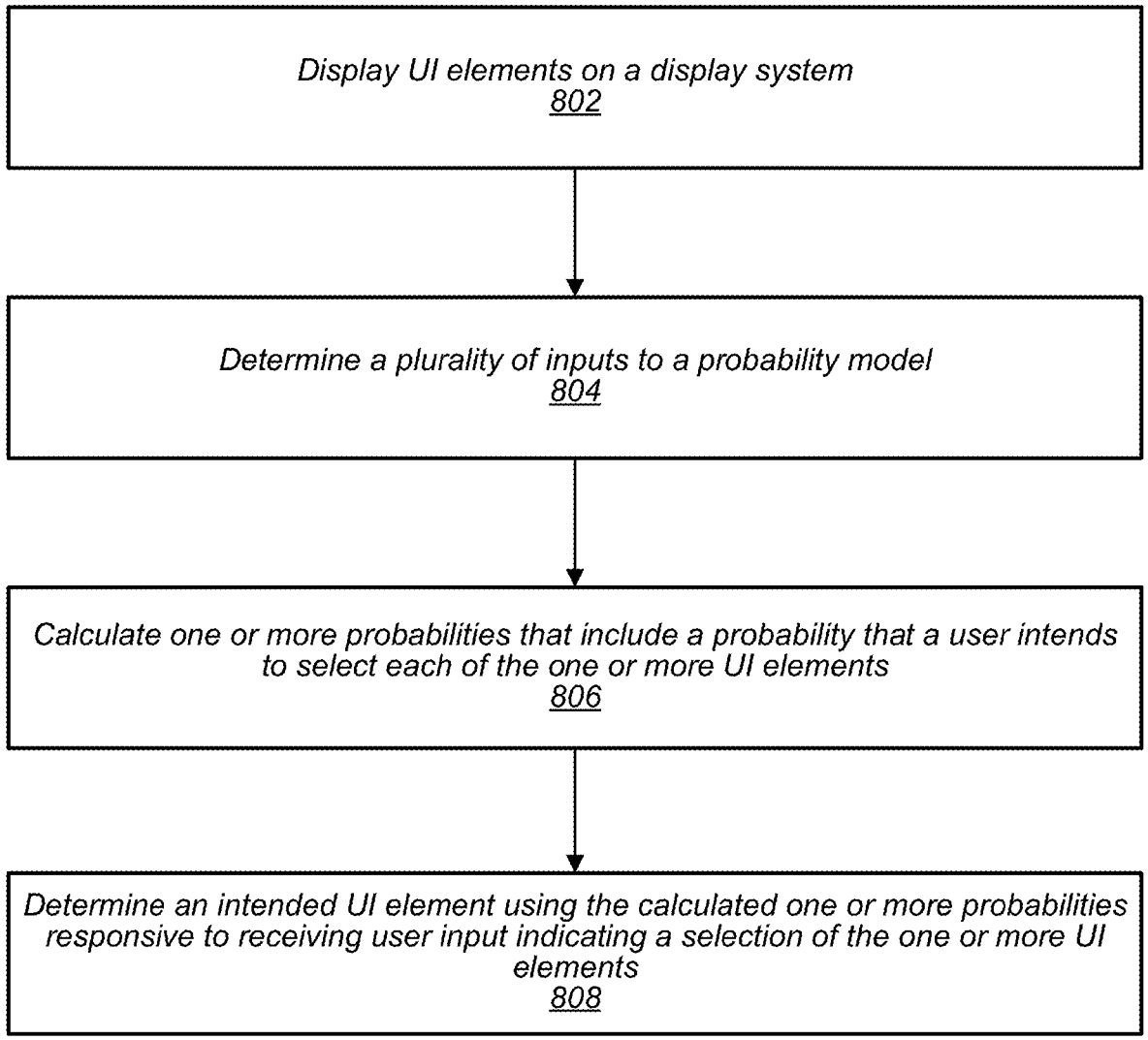
FIG. 8 illustrates a block diagram of an example of a method for enhancement of ease and accuracy of selecting virtual objects in a user interface of a 3D (and/or 2D) display system, according to some embodiment.

FIG. 8 illustrates a block diagram of an example of a method for enhancement of ease and accuracy of selecting virtual objects in a user interface of a 3D (and/or 2D) display system, according to some embodiment. The method shown in FIG. 8 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 802, one or more virtual objects (e.g., user interface (UI) elements, UI items (e.g., a virtual object within a tool bar and/or tool box), virtual models, and so forth) may be displayed on a display system, such as display systems 100A-B.

At, 804, a plurality of inputs to a probability model may be determined. In some embodiments, the plurality of inputs to the probability model may include any, any combination of, and/or all of a user head state, a user eye state, a stylus state, a previous output of the probability model, a virtual object state, a user attribute, and/or an output from a device. In some embodiments, the user head state may include a position and/or an orientation of the user's head. In some embodiments, the user head state may include a velocity of the user's head. In some embodiments, the user eye state may include a gaze direction. In some embodiments, the user eye state may include a velocity of the user's eye gaze. In some embodiments, the stylus state may include a position and an orientation of a stylus. In some embodiments, the stylus state may include a velocity of a stylus. In some embodiments, the stylus state includes a value indicative of whether or not a button of a stylus was pressed within a predetermined period of time. In some embodiments, the previous output of the probability model may include a previous calculated probability for each of the one or more virtual objects. In some embodiments, the virtual object state may include a position of each of the one or more virtual objects on the display. In some embodiments, the virtual object state may include a velocity of each of the one or more virtual objects on the screen. In some embodiments, the user attribute may include any, any combination of, and/or all of an age of the user, a sex of the user, a gender of the user, a of the user, a nationality of the user, and/or an experience level of the user. In some embodiments, the output from the device may include any, any combination of, and/or all of a confidence value of a tracking system, data from a personal electronic device (e.g., such as a UE and/or wireless device) of the user, and/or data from a computer vision system. In some embodiments, the probability model may be trained based, at least in part, on one or more user sessions. In some embodiments, training the probability model may customize the probability model to a plurality of particular users. In some embodiments, the plurality of particular users may share (and/or be associated with) one or more user attributes (and/or combinations of user attributes). In some embodiments, the probability model may be based, at least in part, on any, any combination of, and/or all of a neural network computational model, a recurrent neural network computational model, an oscillating neural network computational model, a Bayesian network computational model, a dynamic Bayesian network computational model, a decision tree computational model, a decision forest computational model, a hidden Markov model computational model, a Gaussian mixture model computational model, and/or a Markov random field computational model.

At 806, one or more probabilities that may include a probability that a user intends to select each of the one or more virtual objects may be calculated via the probability model. In some embodiments, the plurality of inputs to the probability model may be processed before calculating the one or more probabilities. In some embodiments, processing the plurality of inputs may include using a filter to remove noise frequencies from the plurality of inputs. In some embodiments, the noise frequencies removed from the plurality of inputs may correspond to one or more specialized spectra. In some embodiments, the specialized spectra may correspond to one or more biomechanical constraints of the user. In some embodiments, the one or more biomechanical constraints may be associated with one or more user attributes (and/or combinations of user attributes).

At 808, responsive to receiving user input indicating a selection of the one or more virtual objects, an intended virtual object may be determined using the calculated one or more probabilities. In some embodiments, a selection probability of an element on the display that corresponds to an advertising element may be recorded.

In some embodiments, responsive to a plurality of the one or more virtual objects having a probability above a predetermined threshold, the display (e.g., a display of the plurality of one or more virtual objects) may be updated. In some embodiments, updating the display may be responsive to the plurality of the one or more virtual objects being within a predetermined range of probabilities. In some embodiments, updating the display may include displaying a confirmation prompt to the user and/or updating an arrangement of the plurality of one or more virtual objects. In some embodiments, updating the arrangement of the plurality of one or more virtual objects may include updating the arrangement of only the plurality of the one or more virtual objects that have the probability above the predetermined threshold and/or animating the plurality of the one or more virtual objects to reduce a probabilistic competition between the plurality of the one or more virtual objects. In some embodiments, updating the display may include changing the appearance of one or more of the plurality of one or more virtual objects and/or changing the appearance of the stylus visualization.

Intelligent Stylus Beam

Figure 9A:
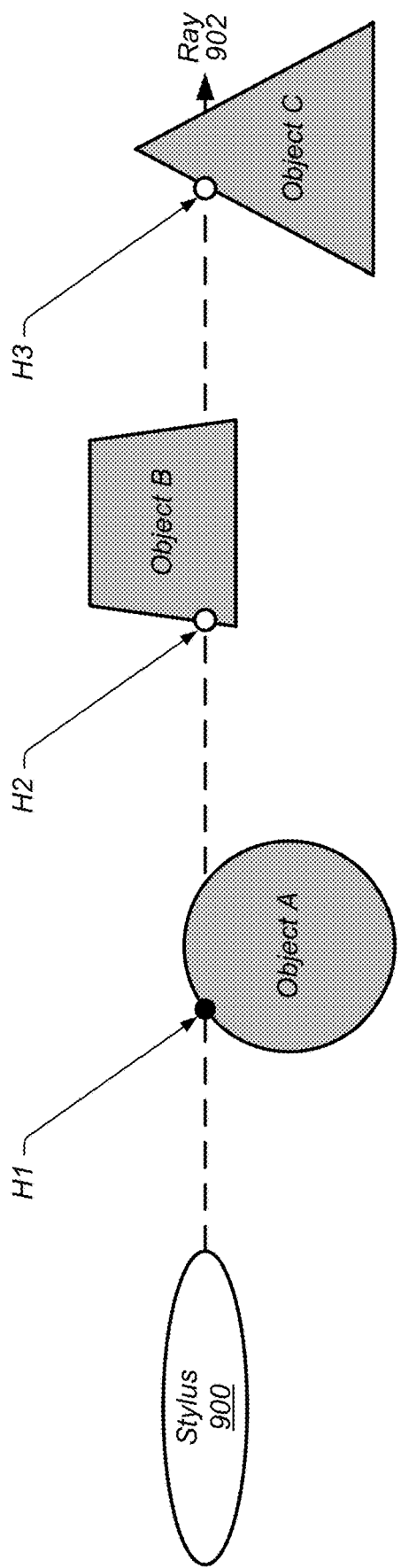
FIGS. 9A-C illustrate examples of object selection.

In existing 3D systems, there are multiple ways a system may detect a user selection of a virtual object (e.g., user interface (UI) elements, UI items (e.g., a virtual object within a tool bar and/or tool box), virtual models, and so forth) via a stylus (and/or other user input devices). For example, a system may use a "ray-cast" approach in which a ray (e.g., invisible line defined by a physical starting position, a physical direction, and a maximum distance) may be cast into a virtual world to determine what virtual objects are intersected. In some instances, intersection results may be based on a closest hit relative to the ray's starting point. For example, FIG. 9A illustrates performance of a ray-cast procedure. As shown, a ray 902 may be cast from a physical tip of a stylus 900 into a virtual world that includes virtual objects A, B, and C. As can be seen, ray 902 may intersect object A at point H1, object B at point H2, and object C at point H3. Under the ray-cast procedure, point H1, being closest to the ray 902's origin (e.g., physical tip of the stylus 900), may be prioritized and reported as the closest hit. Thus, selection of object A may be prioritized over selection of object B or C. Note that a starting point and direction of ray 902 may be based on a physical position and orientation of stylus 900 relative to a 3D system displaying the virtual world.

Figure 9B:
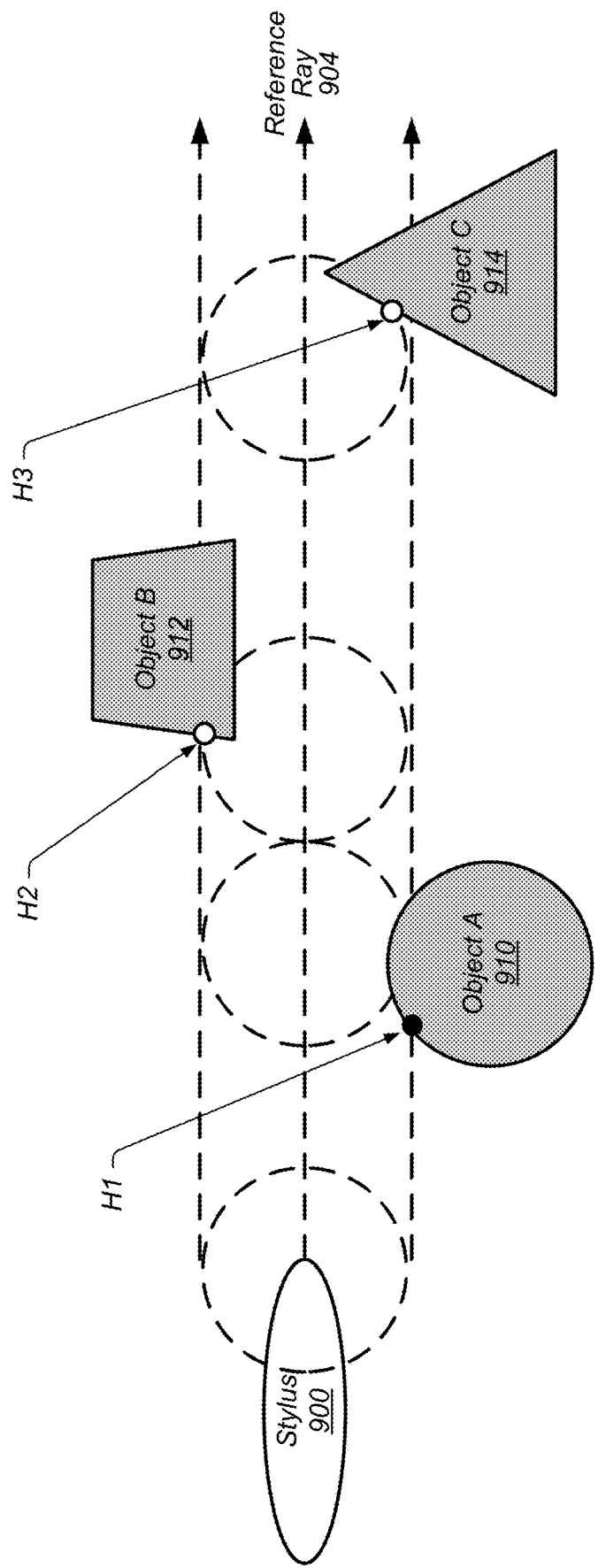

As another example, a system may use a "sphere-cast" approach in which a sphere along a ray (e.g., a ray with a radius) may be cast into a virtual world to determine what objects/models are intersected. For example, FIG. 9B illustrates performance of a sphere-cast procedure. As shown, a sphere may cast into a virtual world that includes virtual objects A, B, and C. The sphere may be cast along reference ray 904 and reference ray 904 may have a starting point and direction based on a physical position and orientation of stylus 900 relative to a 3D system displaying the virtual world. As shown, the casted sphere may intersect object A at point H1, object B at point H2, and object C at point H3. Under the sphere-cast procedure, point H1, being closest to the casted sphere's origin (e.g., physical tip of the stylus 900), may be prioritized and reported as the closest hit. Thus, selection of object A may be prioritized over selection of object B or C.

Figure 9C:
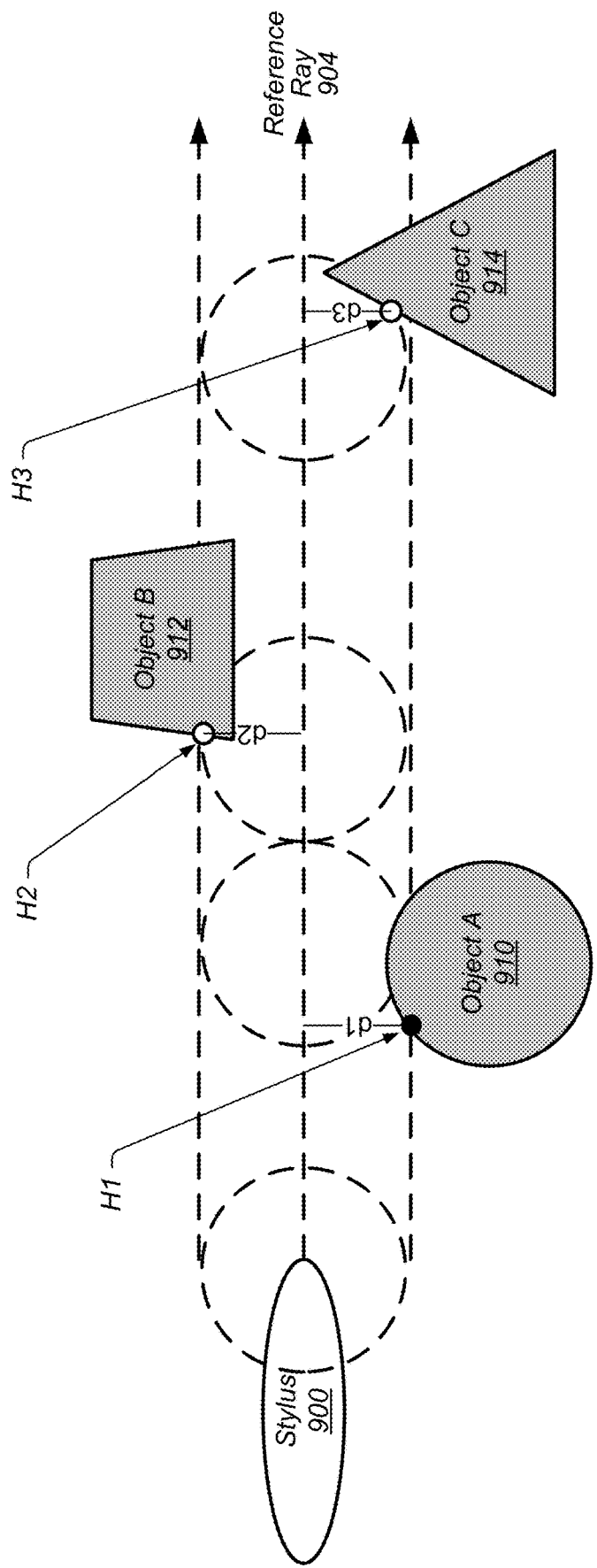

However, such a hit point sorting approach may be considered naive (lacking) due to the fact that such an approach may fail in a scenario where objects are tightly clustered together. As a result, using such a sorting technique may make it difficult to select and grab objects in a background of a virtual scene that are in-between objects in the foreground (and closer to the original reference ray). For example, when using the basic hit point sorting approach depicted in FIG. 9B, a user may be unable to intersect with object C (e.g., a user would be unable to select object C). Thus, in some instances, the hit point sorting approach may be adjusted to prioritize hit points based on a distance from a reference ray's line as opposed to its origin. For example, as shown in FIG. 9C, object C may be considered the closest hit since hit point H3 is closer (distance d3) to reference ray 904 (e.g., center of the sphere-cast) than hit point H2 (distance d2) or hit point H1 (distance d1).

Figure 10:
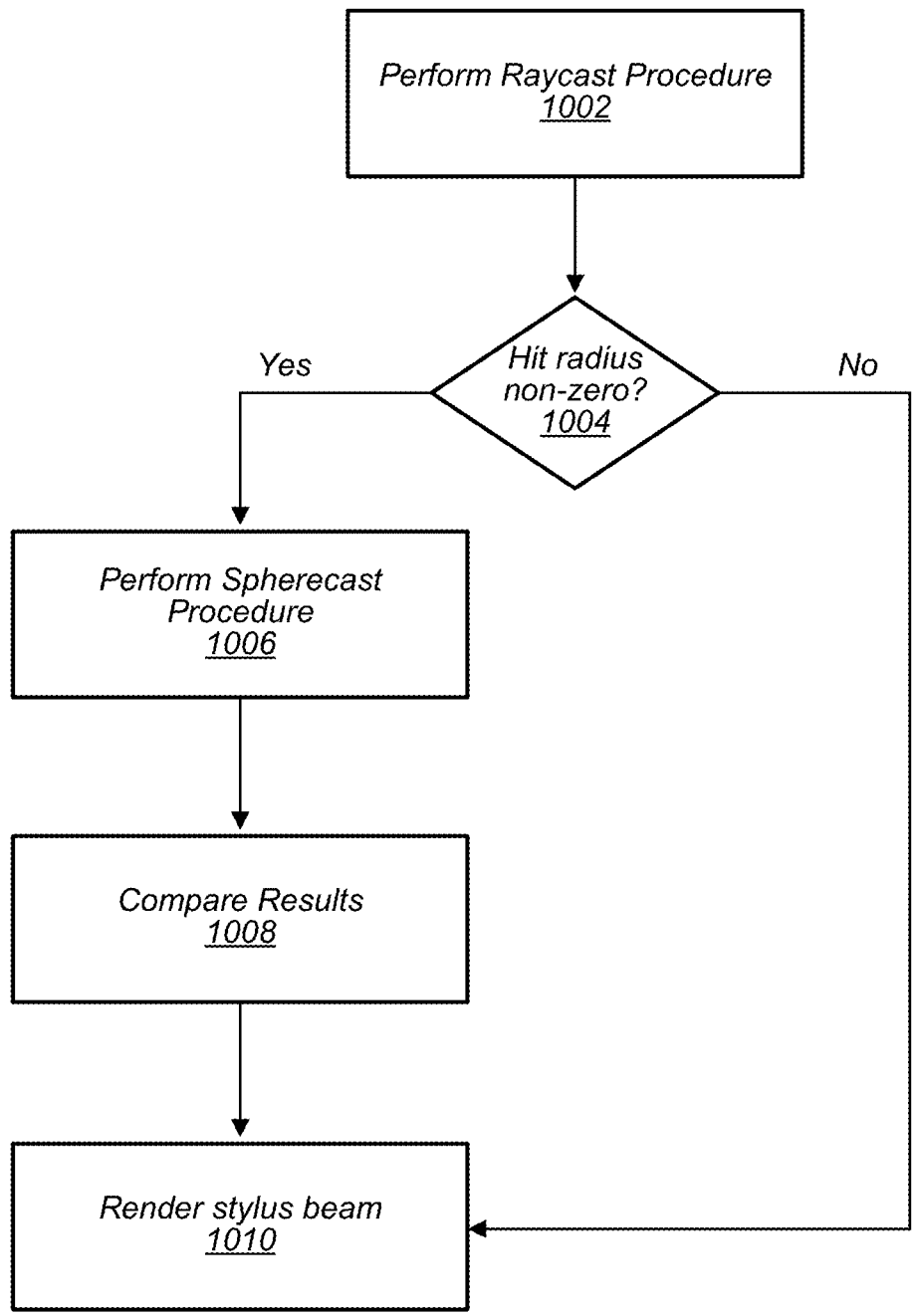
FIG. 10 illustrates a flow diagram of an example of a method for user selection of a virtual object in a virtual world, according to some embodiments.

Embodiments described herein provide enhanced mechanisms to allow a user to select and grab virtual objects (e.g., user interface (UI) elements, UI items (e.g., a virtual object within a tool bar and/or tool box), virtual models, and so forth). In some embodiments, ray-cast and sphere-cast approaches may be combined. In some embodiments, further refinements may be introduced to ensure a higher level of accuracy and/or stability in user selection of virtual objects. For example, FIG. 10 illustrates a flow diagram of an example of a method for user selection of a virtual object in a virtual world, according to some embodiments. The method shown in FIG. 10 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1002, a ray-cast procedure may be performed. In other words, a ray may be cast into a virtual world from a tip of a user input device, such as stylus 600 described above. In some embodiments, intersection results may be captured (e.g., intersections with virtual objects may be detected and objects may be ranked (or prioritized) based on distance from an origin of the ray). In some embodiments, a hit radius of the ray-cast may be configurable, thus, as 1004, it may be determined whether the hit radius is non-zero.

At 1006, in response to determining that the hit radius is non-zero, a sphere-cast may be performed. In some embodiments, an intelligent hit point sorting approach to capture an intersection result closest to a reference ray (e.g., center of the casted sphere) may be used. In some embodiments, if an intersection is determined, a hit radius may be temporarily increased by a specified percentage of its originally specified value (e.g., by 5%, 10%, 15%, 20%, 25%, and so forth). Increasing the hit radius temporarily may cause a user to move (adjust) the stylus such that the sphere-cast is no longer intersecting the virtual object (note that at lower percentages, the user may not perceive the loss of the intersection). Once the virtual object is no longer intersected, the hit radius may be restored back to its original value. Such a scheme may be useful in a scenario where a user is straddling a boundary between intersecting and not intersecting a virtual object. In such a scenario, since a user may have difficulty (e.g., it may be almost impossible for the user to hold their hand steady) keeping a steady hand, the system may enter a state where selection of a virtual object oscillates back and forth as the sphere-cast detects intersection with the virtual object and then no intersection with the virtual object (which may result in a beam projected from the tip of the stylus to appear to "flicker" due its length rapidly changing). Thus, dynamically altering the hit radius may eliminate such an instability (e.g., eliminate hysteresis in selection of a virtual object).

At 1008, intersection results from the ray-cast and sphere-cast may be compared and/or prioritized. In some embodiments, if the ray-cast succeeds (detects an intersection) and the sphere-cast fails (does not detect an intersection), results from the ray-cast may be prioritized over results from the sphere-cast. In some embodiments, if the ray-cast fails and the sphere-cast succeeds, results from the sphere-cast may be prioritized over results from the ray-cast.

Figure 11:
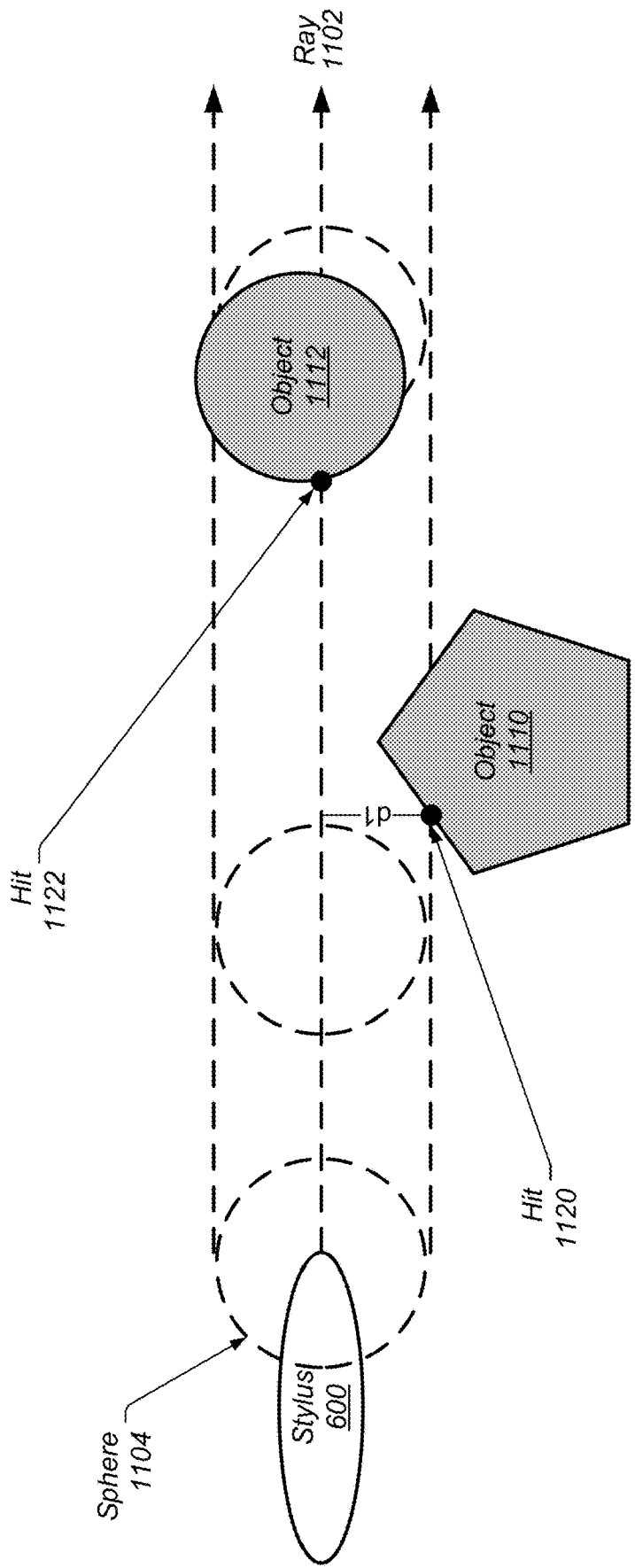
FIGS. 11 and 12 illustrate examples of object selection, according to some embodiments.

In some embodiments, if both the ray-cast and sphere-cast succeed and the detection results differ, results from the ray-cast may be prioritized over results from the sphere-cast. In some embodiments, such a prioritization may enhance accuracy when a user is pointing the stylus at a virtual object, e.g., as illustrated by FIG. 11. As shown in FIG. 11, a user may position a stylus 600 to target a virtual object displayed in a virtual scene, such as objects 1110 and 1112. A system, such as systems 100A or B, may determine a position of the stylus 600. In some embodiments, stylus 600 may be a passive stylus and the system may track the stylus 600 in physical space to determine position and/or orientation of the stylus 600. In some embodiments, stylus 600 may be an active stylus (e.g., may include instrumentation to measure position and/or orientation) and may aid the system in determining position and/or orientation of the stylus 600, e.g., by providing position and/or orientation related information to the system. Based on the position and/or orientation of the stylus, the system may determine a start point and direction of a ray from a tip of the stylus 600, as shown. In addition to projecting (cast) a ray 1102 into the virtual scene, the system may also project (casting) a sphere 1104 into the virtual scene. In some embodiments, the sphere may have a configurable (and/or adjustable) radius. As shown, ray 1102 may intersect object 1112 at hit point 1122 whereas sphere 1104 may intersect object 1110 at hit point 1120. The system may record both hit points and prioritize hit points for the ray-cast procedure and sphere-cast procedure independently. Upon comparing results, the system may determine that the ray-cast prioritized hit point 1122 first and sphere-cast prioritized hit point 1120 first. Thus, to enhance accuracy when a user is pointing the stylus at a virtual object, the system may prioritize the ray-cast results (e.g., hit point 1122) over the sphere-cast results (e.g., hit point 1120) and select object 1112 for the user.

Figure 12:
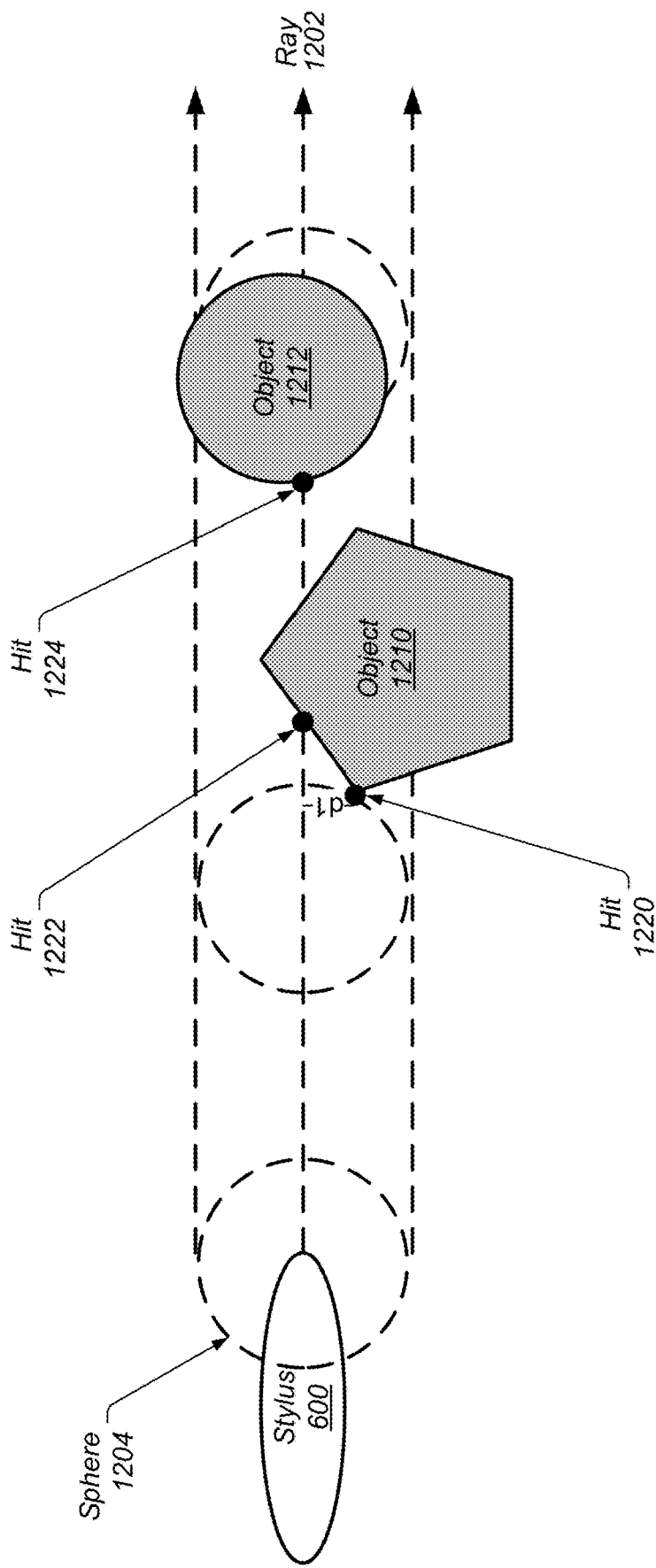

In some embodiments, if both the ray-cast and sphere-cast succeed and the results are the same, results from the sphere-cast may be prioritized over results from the ray-cast. In some embodiments, such a prioritization may enhance user experience by ensuring that a hit point will not "jump" to the ray-cast result's hit point when transitioning from the state where the sphere-cast succeeds and ray-cast fails to a state where both the sphere-cast and ray-cast succeed, e.g., as illustrated by FIG. 12. As shown in FIG. 12, a user may position a stylus 600 to target a virtual object displayed in a virtual scene, such as objects 1210 and 1212. A system, such as systems 100A or B, may determine a position of the stylus 600. In some embodiments, stylus 600 may be a passive stylus and the system may track the stylus 600 in physical space to determine position and/or orientation of the stylus 600. In some embodiments, stylus 600 may be an active stylus (e.g., may include instrumentation to measure position and/or orientation) and may aid the system in determining position and/or orientation of the stylus 600, e.g., by providing position and/or orientation related information to the system. Based on the position and/or orientation of the stylus, the system may determine a start point and direction of a ray from a tip of the stylus 600, as shown. In addition to projecting (casting) a ray 1202 into the virtual scene, the system may also project (cast) a sphere 1204 into the virtual scene. In some embodiments, the sphere may have a configurable (and/or adjustable) radius. As shown, ray 1202 may intersect object 1210 at hit point 1222 and object 1212 at hit point 1224 whereas sphere 1204 may intersect object 1210 at hit point 1220. The system may record these hit points and prioritize hit points for the ray-cast procedure and sphere-cast procedure independently. Upon comparing results, the system may determine that the ray-cast prioritized hit point 1222 first and sphere-cast prioritized hit point 1220 first. Thus, to enhance user experience by ensuring that a hit point will not "jump" to the ray-cast result's hit point when transitioning from the state where the sphere-cast succeeds and ray-cast fails to a state where both the sphere-cast and ray-cast succeed, the system may prioritize the sphere-cast results (e.g., hit point 1220) over the ray-cast results (e.g., hit point 1222) and select object 1210 for the user.

At 1010, a stylus beam may be rendered, e.g., based on which procedure results are being used. For example, if the selected hit point is collinear with the casted ray (e.g., implying that the ray-cast results have been prioritized over the sphere-cast results), a straight, rigid beam may be rendered from the tip of the stylus. As another example, if the selected hit point is non-collinear with the casted ray (e.g., implying that the sphere-cast results have been prioritized over the ray-cast results), a curved beam that may appear to "snap" (e.g., become and/or be animated) to the selected hit point may be rendered. In some embodiments, when a user is freely moving a stylus around a virtual world, a tip of the rendered beam may be animated to provide smooth transitions as the rendered beam snaps from object to object. In some embodiments, once a grab (e.g., user selection of a virtual object) is initiated, a shape of the beam may be locked and/or rigid such that the rendered beam moves in lock-step with the virtual object that is currently grabbed. In some embodiments, once the grab is completed, the beam may transition back to its fluid, animated state.

In some embodiments, to aid in selection of a virtual object, as the stylus beam approaches what is determined to be a target (e.g., object to be selected), "complexity" of objects in the vicinity may be reduced. In other words, renderings of objects near and/or proximate to the target object may be simplified to aid the user in selection of the target object.

In some embodiments, criteria for "snapping" to a target object may depend on (and/or be based, at least in part, on) whether the target object is a model (e.g., a virtual object within a virtual scene) or a user interface item (e.g., a virtual object within a tool bar and/or tool box of the virtual scene).

In some embodiments, when multiple styluses are interacting on a single environment (e.g., a multiuser use case), rules for selection a virtual object may be defined to aid in user object selection and/or or to avoid conflicts in user object selection. For example, once a first user selects a virtual object, a virtual bema of a second user may be attracted (e.g., drawn to and/or snapped to) to the virtual object when in proximity of the virtual object. Further, in some embodiments, once a first user selects a virtual object, other users may not be allowed to select the virtual object until the first user releases it. In some embodiments, once a first user selects a virtual object, other users may be allowed to perform certain operations and/or tasks on the object (e.g., alter the virtual object in some manner, e.g., cut, reshape, resize, recolor, and forth).

In some embodiments, as an amount of time a virtual object is designated by a virtual beam increases, an amount of attachment of the virtual beam to the virtual object increases. In other words, the more a user interacts with a virtual object, the more likely the user will continue to interact with the virtual object, thus, an adjustment by the system allows for easier selection of the virtual object via a stronger (e.g., from a greater distance than normal) snap to the virtual object. In some embodiments, after a number of selections and/or an amount of time of designation by a virtual beam, the virtual object may become "designated" thereby allowing secondary and/or subsequent selection of the virtual object easier to accomplish. In some embodiments, this designation forms or contributes to a statistical prior or Bayesian prior for the aforementioned probabilistic models.

In some embodiments, when objects within a virtual scene are in motion, the system may predict (and/or determine) which object a user intends to select (e.g., based on motion of the stylus in addition to position and/or orientation of the stylus) and may snap the virtual beam to the virtual object. For example, if the virtual scene was a race that included many runners and the system determines (or predicts) the user is attempting to select a leader of the race, the virtual beam may snap to the leader. As another example, if the virtual scene was a coral reef with an abundant amount of sea life moving through the virtual scene, the system may determine which creature the use is intending to select and snap to that creature. In some embodiments, prioritization as a function of velocity may be determined from the probabilistic model.

In some embodiments, the ray-cast results or sphere-cast results may be prioritized by the probabilistic input model previously discussed, e.g., by selecting the virtual object whose probability value in the output vector is highest.

In some embodiments, the user may wish to toggle on/off the intelligent stylus beam behavior and/or toggle on/off the probabilistic input behavior. In such embodiments, when toggled off, the system may perform a simple ray-cast procedure and report the first virtual object or object hit, if any. Conversely, when toggled on, the aforementioned intelligent stylus beam and/or probabilistic input behaviors apply. In some embodiments, the user may press and release a button on a user input device to toggle modes, press and hold the button to toggle on until released, press and hold to toggle off until released, and/or may do any of the above using a keyboard button or touchpad button.

Figure 13:
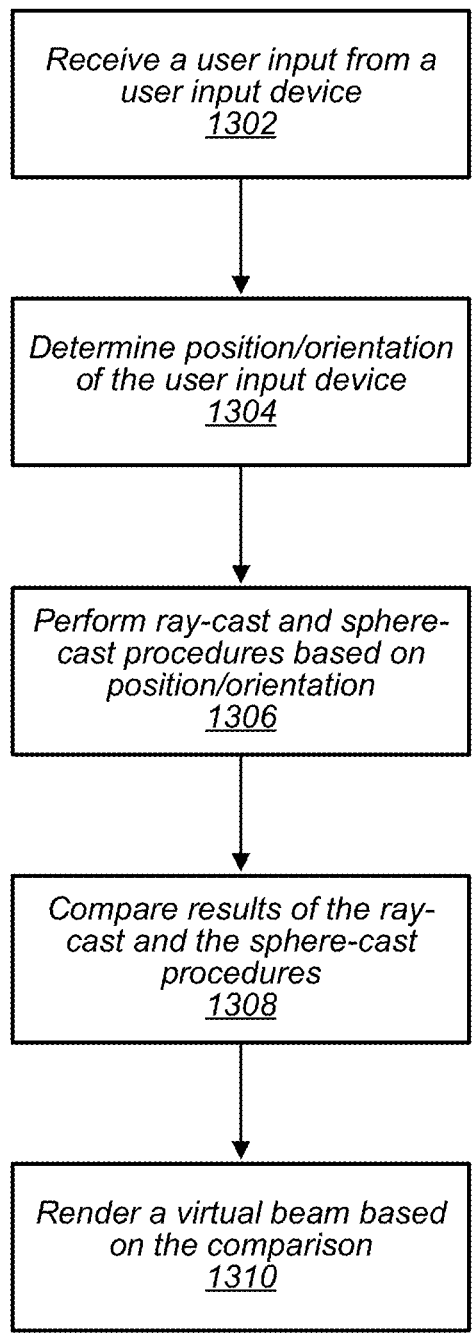
FIG. 13 illustrates an example of a method for user selection of a virtual object in a virtual scene, according to some embodiments.

FIG. 13 illustrates an example of a method for user selection of a virtual object in a virtual scene, according to some embodiments. The method shown in FIG. 13 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1302, a user input may be received, e.g., via a user input device. The user input may be an attempt to select a virtual object rendered in a virtual scene on a display of a display system. In some embodiments, the virtual scene may be a three-dimensional (3D) virtual scene. In some embodiments, the display may be a 3D stereoscopic display.

At 1304, a position and orientation of the user input device may be determined in response to the first user input. In some embodiments, determining a position and orientation of the user input device may include tracking, via inputs received from a tracking system of the display system, a position and orientation of the user input device. In some embodiments, the user input device may include one or more visually indicated points (and/or a pattern of visually indicated points). In some embodiments, information associated with position and/or orientation of the user input device may be received (e.g., by the tracking system and/or the system in general) from the user input device. In some embodiments, the position and orientation of the user input device may be relative to the display. In some embodiments, the user input device may be a stylus.

At 1306, based on the position and orientation of the user input device, a ray-cast procedure and a sphere-cast procedure may be performed to determine the virtual object being selected. In some embodiments, performing the ray-cast procedure may include determining a starting location and direction of a ray based on the position and orientation of the user input device. Additionally, one or more hit points may be determined. Note that in a ray-cast procedure, a hit point may include an intersection between the ray and a virtual object of the virtual scene. The one or more hit points may be prioritized based on a distance from intersection with a virtual object to the starting location of the ray. In some embodiments, performing the sphere-cast procedure may include determining a starting location and direction of a reference ray based on the position and orientation of the user input device and a radius of a sphere moving along the reference ray. Additionally, one or more hit points may be determined. Note that in a sphere-cast procedure, a hit point may include an intersection between the sphere and a virtual object of the virtual scene. The one or more hit points may be prioritized based on a distance from intersection with a virtual object to the starting location of the ray and a distance from the intersection and the reference ray. In some embodiments, determining the one or more hit points may include temporarily increasing a hit radius by a specified percentage of its originally specified value upon detection of an intersection and, upon determining there is no longer an intersection, returning the hit radius to its originally specified value. In some embodiments, the ray-cast procedure and the sphere-cast procedure may each include a configurable hit radius.

At 1308, results of the ray-cast procedure and the sphere-cast procedure may be compared. In some embodiments, when the results differ, ray-cast results may be prioritized over sphere-cast results. In some embodiments, when the results do not differ, the sphere-cast results may be prioritized over the ray-cast results.

At 1310, a virtual beam may be rendered from the user input device to the virtual object based on the comparison. In some embodiments, when ray-cast results are used, the virtual beam may be straight and rigid. In some embodiments, when sphere-cast results are used, the virtual beam may be non-rigid and curve to the virtual object.

In some embodiments, in response to determining that the ray-cast procedure has failed in identifying an intersection, results of the sphere-cast procedure may be prioritized. In some embodiments, in response to determining that the sphere-cast procedure has failed in identifying an intersection, results of the ray-cast procedure may be prioritized.

In some embodiments, renderings of virtual objects proximate the virtual object may be simplified (e.g., displayed with less realism) in response to determining that the virtual beam is approaching the virtual object. In some embodiments, an amount of time the virtual object has been selected may be monitored. Further, in response to the amount of time exceeding a threshold, the virtual object may be designated as a priority virtual object. In some embodiments, selection of a priority virtual object may be prioritized over selection of a non-prioritized virtual object, thereby easing subsequent selection of the virtual object.

In some embodiments, multiple virtual objects may be moving within the virtual scene and, based on results of one of the ray-cast or sphere-cast, it may be determined that the user intends to select one or more of the moving virtual objects. Responsive to the determination, the virtual beam may be snapped to the moving virtual object (and/or a group of moving virtual objects), e.g., to aid in selection of the moving virtual object.

It is well understood that the use of personally identifiable information, such as user metrics and/or user characteristics, should follow privacy policies and practices that are generally recognized as meeting or exceeding industry or governmental requirements for maintaining the privacy of users. In particular, personally identifiable information data should be managed and handled so as to minimize risks of unintentional or unauthorized access or use. Additionally, the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer readable memory medium storing programming instructions executable by a processor of a display system to:
   render a plurality of virtual objects in a virtual scene displayed on at least one display of the display system;
   determine a plurality of inputs to a probability model associated with selection of each virtual object of the plurality of virtual objects, wherein the plurality of inputs comprise a virtual object state and one or more of a user head state, a user eye state, a user input device state, a previous output of the probability model, a user attribute, or an output from a device in communication with the display system, and wherein the virtual object state includes a position and velocity of each of the plurality of virtual objects within the virtual scene;
   calculate, for each virtual object of the plurality of virtual objects, a probability that a user intends to select that virtual object using the probability model; and
   determine, responsive to a user input via a user input device, an intended virtual object of the plurality of virtual objects based on the calculated probabilities.

2. The non-transitory computer readable memory medium of claim 1,
   wherein the output from the device in communication with the display system includes at least one of:
   a confidence value of a tracking system;
   data from a personal electronic device of the user; or
   data from a computer vision system.

3. The non-transitory computer readable memory medium of claim 1,
   wherein the probability model is trained based, at least in part, on one or more user sessions.

4. The non-transitory computer readable memory medium of claim 3,
   wherein training the probability model includes customizing the probability model to a plurality of particular users, and wherein the plurality of particular users are associated with one or more user attributes.

5. The non-transitory computer readable memory medium of claim 1,
   wherein the probability model is based, at least in part, on one or more of:
   a neural network computational model;
   a recurrent neural network computational model;
   an oscillating neural network computational model;
   a Bayesian network computational model;
   a dynamic Bayesian network computational model;
   a decision tree computational model;
   a decision forest computational model;
   a hidden Markov model computational model;
   a Gaussian mixture model computational model; or
   a Markov random field computational model.

6. The non-transitory computer readable memory medium of claim 1,
   wherein the user head state includes a position, an orientation, and a velocity of the user's head.

7. The non-transitory computer readable memory medium of claim 1,
   wherein the user eye state includes a gaze direction and a velocity of the user's eye gaze.

8. The non-transitory computer readable memory medium of claim 1,
   wherein the user input device state includes a position, an orientation, and a velocity of the user input device.

9. The non-transitory computer readable memory medium of claim 1,
   wherein the previous output of the probability model includes a previous calculated probability for each of the plurality of virtual objects.

10. A three-dimensional (3D) stereoscopic display system, comprising:
    at least one processor;
    one or more displays, coupled to the at least one processor;
    a tracking system comprising two or more cameras and in communication with the at least one processor; and
    a memory in communication with the tracking system and the at least one processor, wherein the at least one processor is configured to:
    render a plurality of virtual objects in a virtual scene displayed on the one or more displays;
    determine a plurality of inputs to a probability model associated with selection of each virtual object of the plurality of virtual objects, wherein the plurality of inputs comprises a virtual object state, a user attribute, and one or more of a user head state, a user eye state, a user input device state, a previous output of the probability model, or an output from a device in communication with the 3D stereoscopic display system, and wherein the virtual object state includes a position and velocity of each of the plurality of virtual objects within the virtual scene;
    calculate, for each virtual object of the plurality of virtual objects, a probability that a user intends to select that virtual object using the probability model; and
    determine, responsive to a user input via a user input device, an intended virtual object of the plurality of virtual objects based on the calculated probabilities.

11. The 3D stereoscopic display system of claim 10,
    wherein the output from the device in communication with the 3D stereoscopic display system includes at least one of:
    a confidence value of the tracking system;
    data from a personal electronic device of the user; or
    data from a computer vision system.

12. The 3D stereoscopic display system of claim 10,
    wherein the probability model is trained based, at least in part, on one or more user sessions, wherein training the probability model includes customizing the probability model to a plurality of particular users, and wherein the plurality of particular users are associated with one or more user attributes.

13. The 3D stereoscopic display system of claim 10, wherein the probability model is based, at least in part, on one or more of:
a neural network computational model;
a recurrent neural network computational model;
an oscillating neural network computational model;
a Bayesian network computational model;
a dynamic Bayesian network computational model;
a decision tree computational model;
a decision forest computational model;
a hidden Markov model computational model;
a Gaussian mixture model computational model; or
a Markov random field computational model.

14. The 3D stereoscopic display system of claim 10, wherein the user head state includes a position, an orientation, and a velocity of the user's head, wherein the user eye state includes a gaze direction and a velocity of the user's eye gaze, and wherein the user input device state includes a position, an orientation, and a velocity of the user input device.

15. The 3D stereoscopic display system of claim 10, wherein the at least one processor is further configured to:
compare results of a ray-cast procedure and a sphere-cast procedure performed in response to the user input and based on a determined position and orientation of the user input device, wherein, when the results differ, ray-cast results are prioritized over sphere-cast results, and wherein, when the results do not differ, the sphere-cast results are prioritized over the ray-cast results; and
render a virtual beam from the user input device to the intended virtual object based on the comparison, wherein when ray-cast results are used, the virtual beam is straight and rigid, and wherein when sphere-cast results are used, the virtual beam is non-rigid and curves to the intended virtual object.

16. A wireless device, comprising:
at least one antenna;
at least one radio in communication with the at least one antenna and configured to perform wireless communication using at least one radio access technology (RAT);
one or more processors coupled to the at least one radio;
a tracking system comprising two or more cameras and in communication with the one or more processors; and
at least one display in communication with the one or more processors;
wherein the one or more processors are configured to cause the wireless device to:
render a plurality of virtual objects in a virtual scene displayed on the at least one display;
determine a plurality of inputs to a probability model associated with selection of each virtual object of the plurality of virtual objects, wherein the plurality of inputs comprise a virtual object state, an output from a device in communication with the wireless device, and one or more of a user head state, a user eye state, a user input device state, a previous output of the probability model, or a user attribute, and wherein the virtual object state includes a position and velocity of each of the plurality of virtual objects within the virtual scene;
calculate, for each virtual object of the plurality of virtual objects, a probability that a user intends to select that virtual object using the probability model; and
determine, responsive to a user input via a user input device, an intended virtual object of the plurality of virtual objects based on the calculated probabilities.

17. The wireless device of claim 16, wherein the output from the device in communication with the wireless device includes at least one of:
a confidence value of the tracking system;
data from a personal electronic device of the user; or
data from a computer vision system.

18. The wireless device of claim 16, wherein the probability model is trained based, at least in part, on one or more user sessions, wherein training the probability model includes customizing the probability model to a plurality of particular users, and wherein the plurality of particular users are associated with one or more user attributes.

19. The wireless device of claim 16, wherein the probability model is based, at least in part, on one or more of:
a neural network computational model;
a recurrent neural network computational model;
an oscillating neural network computational model;
a Bayesian network computational model;
a dynamic Bayesian network computational model;
a decision tree computational model;
a decision forest computational model;
a hidden Markov model computational model;
a Gaussian mixture model computational model; or
a Markov random field computational model.

20. The wireless device of claim 16, wherein the user head state includes a position, an orientation, and a velocity of the user's head, wherein the user eye state includes a gaze direction and a velocity of the user's eye gaze, wherein the user input device state includes a position, an orientation, and a velocity of the user input device, and wherein the previous output of the probability model includes a previous calculated probability for each of the plurality of virtual objects.

* * * * *